US008750498B1

(12) United States Patent
Poo et al.

(10) Patent No.: US 8,750,498 B1
(45) Date of Patent: *Jun. 10, 2014

(54) METHOD AND APPARATUS FOR ENCODING DATA IN ACCORDANCE WITH THE ADVANCED ENCRYPTION STANDARD (AES)

(75) Inventors: Tze Lei Poo, Sunnyvale, CA (US); Heng Tang, Sunnyvale, CA (US); Siu-Hung Fred Au, Fremont, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 23 days.

This patent is subject to a terminal disclaimer.

(21) Appl. No.: 13/442,202

(22) Filed: Apr. 9, 2012

Related U.S. Application Data

(63) Continuation of application No. 11/973,856, filed on Oct. 10, 2007, now Pat. No. 8,155,308.

(60) Provisional application No. 60/828,871, filed on Oct. 10, 2006, provisional application No. 60/886,027, filed on Jan. 22, 2007.

(51) Int. Cl.
*G06F 21/00* (2013.01)
*H04L 9/00* (2006.01)

(52) U.S. Cl.
USPC .................................. 380/29; 380/37; 380/42

(58) Field of Classification Search
None
See application file for complete search history.

(56) References Cited

U.S. PATENT DOCUMENTS

| 7,720,219 | B1 | 5/2010 | Olson et al. |
| 2003/0198345 | A1* | 10/2003 | Van Buer ........................ 380/43 |
| 2004/0202317 | A1 | 10/2004 | Demjanenko et al. |
| 2006/0002548 | A1 | 1/2006 | Chu |

OTHER PUBLICATIONS

Block cipher modes of operation; From Wikipedia, the free encyclopedia (Redirected from Cipher block chaining) Jan. 18, 2007; 10 pages.
IEEE Transactions on Computers, vol. 55, No. 4, Apr. 2006; Area-Throughput Trade-Offs for Fully Pipelined 30 to 70 Gbits/s AES Processors; Alireza Hodjat, Student Member, IEEE, and Ingrid Verbauwhede, Senior Member, IEEE; 7 pages.
IEEE P1619 D4; Feb. 16, 2006; Draft Standard Architecture for Encrypted Shared Storage Media; Sponsored by the Security in Storage Workgroup of the IEEE Computer Society; Copyright © 2006 by the Institute of Electrical and Electronics Engineers, Inc.; Three Park Avenue; New York, New York 10016-5997, USA; 27 pages.

(Continued)

*Primary Examiner* — Gilberto Barron, Jr.
*Assistant Examiner* — Malcolm Cribbs

(57) ABSTRACT

A cryptographic device includes a first state module, a key addition module, a byte substitution module, and a column mixing module. The first state module stores a first data block. The key addition module adds a key to the first data block to generate a second data block. The byte substitution module replaces each byte of the second data block to generate a third data block. The byte substitution module includes a first byte substitution sub-module that generates an intermediate data block in response to the second data block, a pipeline register that stores the intermediate data block, and a second byte substitution sub-module that generates the third data block in response to the intermediate data block. The column mixing module generates a fourth data block based on the third data block and provides the fourth data block to the first state module for storage.

18 Claims, 30 Drawing Sheets

(56) References Cited

OTHER PUBLICATIONS

An ASIC Implementation of the AES SBoxes; Johannes Wolkerstorfer1, Elisabeth Oswald1, and Mario Lamberger2; 1Institue for Applied Information Processing and communications, Graz University of Technology, Inffeldgasse 16a, A-8010 Graz, Austria; Johannes.Wolkerstorefer@iaik.at, http://www.iaik.at; 2Department of Mathematics, Graz University of Technology, Steyrergasse 20, A-8010 Graz, Austria; B. Preneel (Ed.): CT-RSA 2002, LNCS 2271, pp. 67-78, 2002; © Springer-Verlag Berlin Heidelberg 2002; 12 pages.

* cited by examiner

METHOD AND APPARATUS FOR ENCODING DATA IN ACCORDANCE WITH THE ADVANCED ENCRYPTION STANDARD (AES)

CROSS-REFERENCE TO RELATED APPLICATIONS

This is a continuation of U.S. patent application Ser. No. 11/973,856, filed on Oct. 10, 2007 (now U.S. Pat. No. 8,155, 308), which claims the benefit of U.S. Provisional Application No. 60/828,871, filed on Oct. 10, 2006 and Provisional Application No. 60/886,027, filed on Jan. 22, 2007. The disclosures of the above provisional applications are incorporated herein by reference in their entirety.

FIELD

The present disclosure relates to encryption and more particularly to hardware architecture implementations of the Advanced Encryption Standard.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1A, a functional data flow diagram depicts the encoding of a data block according to the advanced encryption standard (AES). AES encrypts a 128-bit block of plaintext into a 128-bit block of ciphertext based upon a key. The key length may be 128 bits, 192 bits, or 256 bits. AES is performed using multiple rounds (Nr). For example, when using a 128-bit AES key, a minimum of ten rounds of encryption are performed (Nr=10).

The first step of AES is key addition 102, where the 128-bit plaintext block is XOR'd with the AES key. The output of key addition 102 is transmitted to a multiple-round encryption module 104. The multiple-round encryption module 104 includes byte substitution 106, row shifting 108, column mixing 110, and key addition 112. The multiple-round encryption module 104 operates Nr−1 times on each AES block.

The output of the multiple-round encryption module 104 is transmitted to a final-round encryption module 114, which is similar to the multiple-round encryption module 104, with the removal of column mixing 110. The output of the final-round encryption module 114 is an encrypted 128-bit block of ciphertext. Decryption is performed similarly, with modifications to byte substitution 106 and column mixing 110.

In further detail, key addition 112 receives a round key from a key expansion module 116. The key expansion module 116 creates a round key for each of the rounds of encryption based upon the received AES key. The key expansion section 116 includes a multiple-round key expansion module 118 and a final-round key expansion module 120. The operation of the final-round key expansion module 120 is similar to that of the multiple-round key expansion module 118.

The multiple-round key expansion module 118 operates Nr−1 times to generate a round key for each of the Nr−1 key additions 112 of the multiple-round encryption module 104. The multiple-round key expansion module 118 includes word substitution 122, round constant determination 124, and logical XOR 126.

Word substitution 122 may replace each 8-bit value of a 32-bit word of the key using similar logic as byte substitution 106, which is discussed in more detail below. Round constant determination 124 may retrieve a round constant from a lookup table. Logical XOR 126 may XOR the transformed word with the round constant from round constant determination 124.

The 128-bit input block for AES encryption and the output of each round of AES encryption may be viewed as a 4×4 grid of 8-bit elements (4×4×8=128 bits) referred to as the AES state. Row shifting 108 cyclically shifts each element over in each row of the AES state. Column mixing 110 uses a column of the AES state as a polynomial, multiplies that polynomial by a predetermined polynomial, and stores the result in the same column of the AES state. Column mixing 110 is performed for each column of the AES state.

Further discussion of AES encryption and decryption can be found in Federal Information Processing Standards Publication 197, "Announcing the Advanced Encryption Standard," National Institute of Standards and Technology, Nov. 26, 2001, the disclosure of which is incorporated herein by reference in its entirety.

Byte substitution 106 replaces each 8-bit element of the AES state with a corresponding 8-bit element. This replacement may be performed using a simple look-up table. To quickly perform AES encryption, the module that performs byte substitution 106, called the S-box, may be instantiated for each of the 16 elements of the AES state. Substitutes for each of the 16 elements of the AES state can then be determined concurrently by 16 S-boxes.

Implementing 16 copies of a look-up table in hardware requires a large number of logic gates. Alternatively, the S-box can determine replacement elements based on the mathematical description of byte substitution 106. The mathematical description includes performing an inversion of the element in a Galois Field (GF). The inversion, performed in GF(256) for the 8-bit value ($2^8$=256), is difficult to implement quickly and size-efficiently in hardware.

One of the inventors of AES, Vincent Rijmen, has disclosed a way of reducing the complexity of a mathematical S-box. The disclosure of "Efficient Implementation of the Rijndael S-box," available at http://www.iaik.tugraz.at/research/krypto/AES/old/~rijmen/rijndael/sbox.pdf, is incorporated herein by reference in its entirety. Rijmen suggests decomposing the 8-bit GF(256) element into two 4-bit GF(16) elements.

Operations in the GF(16) domain, and especially inversion, require less processing overhead, allowing the byte substitution 106 to be performed in a reasonable time. The 4-bit elements can then be converted back to an 8-bit value. One implementation of this decomposition and resulting GF(16) operations is presented in FIG. 1B.

Further discussion of the mathematics behind the S-box can be found in "An ASIC Implementation of the AES SBoxes," Johannes Wolkerstorfer, Elisabeth Oswald, & Mario Lamberger, Proceedings of the Cryptographer's Track at the RSA Conference 2002, San Jose, Calif., USA, Lecture Notes in Computer Science Vol. 2271/2002, February 2002, the disclosure of which is incorporated herein by reference in its entirety.

Referring now to FIG. 1B, a functional block diagram of a mathematical implementation of the byte substitution function of AES using Galois Field operations is presented. A storage register 150 provides an 8-bit element of the AES state to a mapping module 152. The mapping module 152 decomposes the 8-bit element from GF(256) into two 4-bit values in GF(16). The two 4-bit values are output to a first squaring module 154 and a second squaring module 156, respectively.

The first and second squaring modules 154 and 156 square their inputs in GF(16). The output of the second squaring module 156 is multiplied with the hexadecimal value E by a first multiplication module 158. A first summation module 160 receives an output of the first multiplication module 158 and an output of the first squaring module 154.

The first and second values from the mapping module 152 are multiplied by a second multiplication module 162. Outputs of the second multiplication module 162 and the first summation module 160 are added by a second summation module 164, the result of which is output to an inversion module 166. An output of the inversion module 166 is output to third and fourth multiplication modules 168 and 170.

The first and second values from the mapping module 152 are summed by a third summation module 172, the result of which is output to the third multiplication module 168. The fourth multiplication module 170 receives the second value from the mapping module 152. The outputs of the multiplication modules 168 and 170 are received by an inverse mapping module 174, which composes the two four-bit values in GF(16) into an 8-bit output value in GF(256).

An affine transform 176 is applied to the output of the inverse mapping module 174. The output of the affine transform 176 is stored in another storage register 178. Because there are 16 elements in the AES state, there may be 16 copies of the S-box shown in FIG. 1B to process the 16 elements concurrently. Alternatively, one S-box can be used to process each of the 16 elements sequentially.

Further discussion of byte substitution can be found in Alireza Hodjat & Ingrid Verbauwhede, "Area-Throughput Trade-Offs for Fully Pipelined 30-to-70 GBits/s AES Processors," IEEE Transactions on Computers, Vol. 55, No. 4, April 2006, the disclosure of which is incorporated herein by reference in its entirety.

SUMMARY

A cryptographic device comprises a first pipeline stage, a pipeline register, and a second pipeline stage. The first pipeline stage comprises a first byte substitution module that performs mathematical operations on a received byte and outputs an intermediate value based on the mathematical operations. The pipeline register stores the intermediate value. The second pipeline stage comprises a second byte substitution module and a column mixing module. The second byte substitution module generates a replacement byte corresponding to the received byte based on mathematical operations performed on the stored intermediate value. The column mixing module transforms groups of four bytes of a plurality of replacement bytes including the replacement byte.

In other features, the first pipeline stage further comprises a key addition module that adds a received key to a plurality of bytes including the received byte before the received byte is processed by the first byte substitution module. The second pipeline stage further comprises a key addition module that adds a received key to the plurality of replacement bytes after transformation by the column mixing module. The second pipeline stage further comprises a row shifting module that reorders groups of four bytes of the plurality of replacement bytes before transformation by the column mixing module, wherein grouping in the row shifting module is orthogonal to grouping in the column mixing module.

In further features, the first byte substitution module comprises a mapping module that converts the received byte from a first Galois Field (GF) into a plurality of elements in a second GF. The second byte substitution module comprises a mapping module that converts a plurality of elements in the second GF into an element in the first GF. The first GF is GF(256) and the second GF is GF(16). The cryptographic device further comprises an inversion module that inverts a first value in a Galois Field; and first and second mathematical modules that generate first and second outputs, respectively, based on first and second inputs, respectively, and the inverted first value.

In still other features, the second byte substitution module comprises an affine module that generates the replacement byte based upon an affine transform. The first byte substitution module includes the inversion module and the first and second mathematical modules. The pipeline register stores the first and second outputs. The first byte substitution module includes the inversion module and the second byte substitution module includes the first and second mathematical modules. The pipeline register stores the inverted first value and the first and second inputs.

In other features, the first byte substitution module comprises an inverse affine module that applies an inverse affine transform to the received byte. The second byte substitution module includes the inversion module and the first and second mathematical modules. The pipeline register stores the first value and the first and second inputs. The first byte substitution module comprises an inverse affine module that selectively applies an inverse affine transform to the received byte.

In further features, the second byte substitution module comprises an affine module that generates the replacement byte by selectively applying an affine transform. The inverse affine module applies the inverse affine transform when in a decryption mode, and the affine module applies the affine transform when in an encryption mode. The column mixing module transforms the groups of four bytes based on a selected mode. The selected mode is one of encryption and decryption.

In still other features, the second byte substitution module includes the inversion module and the first and second mathematical modules. The pipeline register stores the first value and the first and second inputs. The second byte substitution module determines the replacement byte corresponding to the received byte according to the Advanced Encryption Standard (AES).

A cryptographic device comprises a first pipeline stage, pipeline storage means for storing the intermediate value, and a second pipeline stage. The first pipeline stage comprises first byte substitution means for performing mathematical operations on a received byte and outputting an intermediate value based on the mathematical operations. The second pipeline stage comprises second byte substitution means for generating a replacement byte corresponding to the received byte based on mathematical operations performed on the stored intermediate value; and column mixing means for transforming groups of four bytes of a plurality of replacement bytes including the replacement byte.

In other features, the first pipeline stage further comprises key addition means for adding a received key to a plurality of bytes including the received byte before the received byte is processed by the first byte substitution means. The second pipeline stage further comprises key addition means for adding a received key to the plurality of replacement bytes after transformation by the column mixing means. The second pipeline stage further comprises row shifting means for reordering groups of four bytes of the plurality of replacement bytes before transformation by the column mixing means, wherein grouping in the row shifting means is orthogonal to grouping in the column mixing means.

In further features, the first byte substitution means comprises mapping means for converting the received byte from a first Galois Field (GF) into a plurality of elements in a second GF. The second byte substitution means comprises second mapping means for converting a plurality of elements in the second GF into an element in the first GF. The first GF is GF(256) and the second GF is GF(16). The cryptographic device further comprises inversion means for inverting a first value in a Galois Field; and first and second mathematical means for generating first and second outputs, respectively, based on first and second inputs, respectively, and the inverted first value.

In still other features, the second byte substitution means comprises affine transform means for generates the replacement byte based upon an affine transform. The first byte substitution means includes the inversion means and the first and second mathematical means. The pipeline storage means stores the first and second outputs. The first byte substitution means includes the inversion means and the second byte substitution means includes the first and second mathematical means. The pipeline storage means stores the inverted first value and the first and second inputs. The first byte substitution means comprises inverse affine transform means for applying an inverse affine transform to the received byte.

In other features, the second byte substitution means includes the inversion means and the first and second mathematical means. The pipeline storage means stores the first value and the first and second inputs. The first byte substitution means comprises inverse affine transform means for selectively applying an inverse affine transform to the received byte. The second byte substitution means comprises affine transform means for generating the replacement byte by selectively applying an affine transform. The inverse affine transform means applies the inverse affine transform when in a decryption mode, and the affine transform means applies the affine transform when in an encryption mode.

In further features, the column mixing means transforms the groups of four bytes based on a selected mode. The selected mode is one of encryption and decryption. The second byte substitution means includes the inversion means and the first and second mathematical means. The pipeline storage means stores the first value and the first and second inputs. The second byte substitution means determines the replacement byte corresponding to the received byte according to the Advanced Encryption Standard (AES).

A method comprises generating an intermediate value by performing mathematical operations on a received byte in a first clock cycle; storing the intermediate value for use in the second clock cycle; generating a replacement byte corresponding to the received byte in a second clock cycle by performing mathematical operations on the stored intermediate value; and transforming a plurality of replacement bytes including the replacement byte in the second clock cycle. The transforming is independently performed on groups of four of the replacement bytes.

In other features, the method comprises adding a received key to a plurality of bytes including the received byte in the first clock cycle before the generating the intermediate value is performed. The method comprises adding a received key to the plurality of replacement bytes in the second clock cycle. The method comprises reordering groups of four of the plurality of replacement bytes in the second clock cycle before the transforming is performed, wherein grouping for the reordering is orthogonal to grouping for the transforming.

In further features, the method comprises converting the received byte from a first Galois Field (GF) into a plurality of elements in a second GF in the first clock cycle. The method comprises converting a plurality of elements in the second GF into an element in the first GF in the second clock cycle. The first GF is GF(256) and the second GF is GF(16). The method comprises inverting a first value in a Galois Field; and determining first and second outputs based on first and second inputs, respectively, and the inverted first value, using mathematical operations.

In still other features, the method comprises generating the replacement byte in the second clock cycle based upon an affine transform. The inverting and the determining are performed in the first clock cycle. The method comprises storing the first and second outputs for use in the second clock cycle. The inverting is performed in the first clock cycle and the determining is performed in the second clock cycle. The method comprises storing the inverted first value and the first and second inputs for use in the second clock cycle.

In other features, the method comprises applying an inverse affine transform to the received byte in the first clock cycle. The inverting and the determining are performed in the second clock cycle. The method comprises storing the first value and the first and second inputs for use in the second clock cycle. The method comprises selectively applying an inverse affine transform to the received byte in the first clock cycle; and generating the replacement byte by selectively applying an affine transform in the second clock cycle.

In further features, the method comprises applying the inverse affine transform when in a decryption mode; and applying the affine transform when in an encryption mode. The transforming is based on a selected mode. The selected mode is one of encryption and decryption. The inverting is performed in the first clock cycle and the determining is performed in the second clock cycle. The method comprises storing the inverted first value and the first and second inputs for use in the second clock cycle. The generating the replacement byte is performed according to the Advanced Encryption Standard (AES).

A cryptographic device comprises a first state module that stores a first data block; a second state module that stores a second data block; a byte substitution module that receives one of the first data block and the second data block and generates an updated data block by replacing each byte of the received data block with a corresponding replacement byte; and a column mixing module that outputs an output data block to one of the first and second state modules. The output data block is created by transforming the updated data block.

In other features, the column mixing module transforms the updated data block in groups of four bytes. Each group of four bytes is transformed independently. The cryptographic device further comprises a key addition module that adds a received key to the output data block before the output data block is output to the one of the first and second state modules. The cryptographic device further comprises a key addition module that adds a received key to the received data block before the byte substitution module creates the updated data block.

In further features, the cryptographic device further comprises a row shifting module that reorders bytes in each group of four bytes of the updated data block before the updated data block is transformed by the column mixing module. The byte substitution module comprises a first byte substitution sub-module, a pipeline register, and a second byte substitution sub-module. The first byte substitution sub-module generates an intermediate data block, the pipeline register stores the intermediate data block, and the second byte substitution sub-module generates the updated data block based on the intermediate data block.

In still other features, the cryptographic device further comprises a key expansion module that transmits a first byte to the first byte substitution sub-module and receives a replacement byte based on the first byte from the second byte substitution sub-module. The first and second state modules also store a third data block and a fourth data block, respectively. The first and second state modules receive N-bit input values to create the first and second data blocks, respectively, wherein N is an integer. The first and second state modules output the first and second data blocks, respectively, using N-bit output values.

In other features, N is 32. The cryptographic device further comprises a first multiplexer that outputs to the first state module a selected one of the output data block from the column mixing module and an input value. The cryptographic device further comprises a third multiplexer that outputs to the second state module a selected one of the output data block from the column mixing module and an input value. The cryptographic device further comprises a second multiplexer that outputs to the byte substitution module a selected one of the first data block from the first state module and the second data block from the second state module. The cryptographic device further comprises a fourth multiplexer that outputs an N-bit output value from a selected one of the first and second state modules, wherein N is an integer.

In further features, N is 32. The cryptographic device further comprises a key expansion module that transmits a first byte to the byte substitution module and receives a replacement byte based on the first byte from the byte substitution module. The byte substitution module determines the replacement byte from a lookup table indexed by the corresponding byte of the received data block. The byte substitution module determines the replacement byte based upon Galois Field operations performed on the corresponding byte of the received data block. The data blocks each comprise 128 bits. The byte substitution module determines the corresponding replacement bytes according to the advanced encryption standard (AES).

A cryptographic device comprises first storage means for storing a first data block; second storage means for storing a second data block; byte substitution means for receiving one of the first data block and the second data block and for generating an updated data block by replacing each byte of the received data block with a corresponding replacement byte; and column mixing means for outputting an output data block to one of the first and second storage means. The output data block is created by transforming the updated data block.

In other features, the column mixing means transforms the updated data block in groups of four bytes. Each group of four bytes is transformed independently. The cryptographic device further comprises key addition means for adding a received key to the output data block before the output data block is output to the one of the first and second storage means. The cryptographic device further comprises key addition means for adding a received key to the received data block before the byte substitution means creates the updated data block.

In further features, the cryptographic device further comprises row shifting means for reordering bytes in each group of four bytes of the updated data block before the updated data block is transformed by the column mixing means. The byte substitution means comprises first byte substitution means for generating an intermediate data block, pipeline storage means for storing the intermediate data block, and second byte substitution means for generating the updated data block based on the intermediate data block.

In still other features, the cryptographic device further comprises key expansion means for transmitting a first byte to the first byte substitution means and for receiving a replacement byte based on the first byte from the second byte substitution means. The first and second storage means also store a third data block and a fourth data block, respectively. The first and second storage means receive N-bit input values to create the first and second data blocks, respectively, wherein N is an integer. The first and second storage means output the first and second data blocks, respectively, using N-bit output values. N is 32.

In other features, the cryptographic device further comprises first selection means for outputting to the first storage means a selected one of the output data block from the column mixing means and an input value. The cryptographic device further comprises third selection means for outputting to the second storage means a selected one of the output data block from the column mixing means and an input value. The cryptographic device further comprises second selection means for outputting to the byte substitution means a selected one of the first data block from the first storage means and the second data block from the second storage means.

In further features, the cryptographic device further comprises fourth selection means for outputting an N-bit output value from a selected one of the first and second storage means, wherein N is an integer. N is 32. The cryptographic device further comprises key expansion means for transmitting a first byte to the byte substitution means and for receiving a replacement byte based on the first byte from the byte substitution means.

In still other features, the byte substitution means determines the replacement byte from a lookup table indexed by the corresponding byte of the received data block. The byte substitution means determines the replacement byte based upon Galois Field operations performed on the corresponding byte of the received data block. The data blocks each comprise 128 bits. The byte substitution means determines the corresponding replacement bytes according to the advanced encryption standard (AES).

A method comprises storing a first data block in a first state module; storing a second data block in a second state module; generating an updated data block by replacing each byte of a received data block with a corresponding replacement byte, where the received data block is one of the first data block and the second data block; transforming the updated data block to create an output data block; and outputting the output data block to one of the first and second state modules.

In other features, the transforming is performed independently in groups of four bytes of the updated data block. The method comprises adding a received key to the output data block before the outputting is performed. The method comprises adding a received key to the one of the received data block before the generating is performed. The method comprises reordering bytes in each group of four bytes of the updated data block before the transforming is performed.

In further features, the replacing comprises generating an intermediate value based on the byte of the received data block in a first clock cycle; storing the intermediate value for use in a second clock cycle; and generating the corresponding replacement byte based on the intermediate value in the second clock cycle. The method comprises performing key expansion using the generating the intermediate value, the storing the intermediate value, and the generating the corresponding replacement byte.

In still other features, the method comprises storing a third data block and a fourth data block in the first and second state modules, respectively. The method comprises storing the first and second data blocks based on N-bit input values, wherein N is an integer. The method comprises outputting the first and second data blocks from the first and second state modules, respectively, using N-bit output values. N is 32. The method comprises selectively outputting to the first state module a selected one of the output data block and an input value. The method comprises outputting to the second state module a selected one of the output data block and an input value.

In other features, the method comprises selectively outputting an N-bit output value from a selected one of the first and second state modules, wherein N is an integer. N is 32. The replacing includes determining the corresponding replacement byte from a lookup table indexed by the byte of the received data block. The replacing includes performing Galois Field operations on the byte of the received data block. The data blocks each comprise 128 bits. The replacing is performed according to the advanced encryption standard (AES).

A cryptographic device comprises a first state module that stores a first data block; a first byte substitution module that determines an intermediate value corresponding to each byte of one of a received data block and the first data block; a second state module that stores the intermediate values; a second byte substitution module that generates an updated data block by determining replacement bytes based on the intermediate values from the second state module; and a column mixing module that transforms the updated data block into an output data block and that outputs the output data block to the first state module.

In other features, the column mixing module transforms the updated data block in groups of four bytes. Each group of four bytes is transformed independently. The cryptographic device further comprises a key addition module that adds a received key to the output data block before the output data block is output to the first state module. The cryptographic device further comprises a key addition module that adds a received key to the one of the received data block and the first data block before the first byte substitution module determines the intermediate values.

In further features, the cryptographic device further comprises a row shifting module that reorders bytes in each group of four bytes of the updated data block before the updated data block is transformed by the column mixing module. The cryptographic device further comprises a third state module that receives N-bit input values to create a second data block. The third state module outputs the second data block to the first byte substitution module, and wherein N is an integer. The third state module receives N-bit input values to create a third data block.

In still other features, N is 32. The third state module outputs the second and third data blocks to the first byte substitution module in adjacent clock cycles. The cryptographic device further comprises a multiplexer that selects one of the received data block and the first data block, and outputs the selected data block to the first byte substitution module. The cryptographic device further comprises a fourth state module that receives the output data block from the column mixing module and that outputs the output data block using N-bit output values, wherein N is an integer.

In other features, the fourth state module receives a second output data block from the column mixing module and outputs the output data block and the second output data block using N-bit output values. N is 32. The fourth state module receives the output data block and the second output data block in adjacent clock cycles. The cryptographic device further comprises a key expansion module that transmits a first byte to the first byte substitution module and receives a replacement byte based on the first byte from the second byte substitution module.

In further features, the cryptographic device further comprises a key expansion module that transmits a first byte to the first byte substitution module and receives an intermediate value based on the first byte from the first byte substitution module. The first byte substitution module determines the intermediate values using Galois Field operations. The second byte substitution module determines the replacement bytes using Galois Field operations. The data blocks each comprise 128 bits. The second byte substitution module determines the replacement bytes according to the advanced encryption standard (AES).

A cryptographic device comprises first storage means for storing a first data block; first byte substitution means for determining an intermediate value corresponding to each byte of one of a received data block and the first data block; second storage means for storing the intermediate values; second byte substitution means for generating an updated data block by determining replacement bytes based on the intermediate values from the second storage means; and column mixing means for transforming the updated data block into an output data block and for outputting the output data block to the first storage means.

In other features, the column mixing means transforms the updated data block in groups of four bytes. Each group of four bytes is transformed independently. The cryptographic device further comprises key addition means for adding a received key to the output data block before the output data block is output to the first storage means. The cryptographic device further comprises key addition means for adding a received key to the one of the received data block and the first data block before the first byte substitution means determines the intermediate values.

In further features, the cryptographic device further comprises row shifting means for reordering bytes in each group of four bytes of the updated data block before the updated data block is transformed by the column mixing means. The cryptographic device further comprises third storage means for receiving N-bit input values to create a second data block. The third storage means outputs the second data block to the first byte substitution means, and wherein N is an integer. The third storage means receives N-bit input values to create a third data block.

In still other features, N is 32. The third storage means outputs the second and third data blocks to the first byte substitution means in adjacent clock cycles. The cryptographic device further comprises selection means for selecting one of the received data block and the first data block, and for outputting the selected data block to the first byte substitution means. The cryptographic device further comprises fourth storage means for receiving the output data block from the column mixing means and for outputting the output data block using N-bit output values, wherein N is an integer.

In other features, the fourth storage means receives a second output data block from the column mixing means and outputs the output data block and the second output data block using N-bit output values. N is 32. The fourth storage means receives the output data block and the second output data block in adjacent clock cycles. The cryptographic device further comprises key expansion means for transmitting a first byte to the first byte substitution means and for receiving a replacement byte based on the first byte from the second byte substitution means.

In further features, the cryptographic device further comprises key expansion means for transmitting a first byte to the first byte substitution means and for receiving an intermediate value based on the first byte from the first byte substitution means. The first byte substitution means determines the intermediate values using Galois Field operations. The second byte substitution means determines the replacement bytes using Galois Field operations. The data blocks each comprise 128 bits. The second byte substitution means determines the replacement bytes according to the advanced encryption standard (AES).

A method comprises storing a first data block in a first state module; determining an intermediate value corresponding to each byte of one of a received data block and the first data block; storing the intermediate values in a second state module; generating an updated data block by determining replacement bytes based on the intermediate values from the second state module; transforming the updated data block into an output data block; and outputting the output data block to the first state module.

In other features, the transforming operates independently on groups of four bytes of the updated data block. The method comprises adding a received key to the output data block before the outputting is performed. The method comprises adding a received key to the one of the received data block and the first data block before the determining is performed. The method comprises reordering bytes in each group of four bytes of the output data block before the outputting is performed.

In further features, the method comprises creating a second data block based on N-bit input values, wherein N is an integer; storing the second data block in a third state module; and outputting the second data block as the received data block. The method comprises creating a third data block based on N-bit input values; and storing the third data block in the third state module. N is 32. The third state module outputs the second and third data blocks in adjacent clock cycles. The method comprises providing the one of the received data block and the first data block to the determining.

In still other features, the received data block is provided as a last round of encryption is being performed on the first data block. The method comprises storing the output data block in a fourth state module; and outputting the output data block using N-bit output values, wherein N is an integer. The method comprises storing a second output data block in the fourth state module; and outputting the second output data block using N-bit output values. N is 32. The method comprises storing the output data block and the second output data block in the fourth state module in adjacent clock cycles.

In other features, the method comprises performing key expansion using the determining the intermediate value, the storing the intermediate values, and the generating the updated data block. The method comprises determining the intermediate values using Galois Field operations. The method comprises determining the replacement bytes using Galois Field operations. The data blocks each comprise 128 bits. The generating the updated data block is performed according to the advanced encryption standard (AES).

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
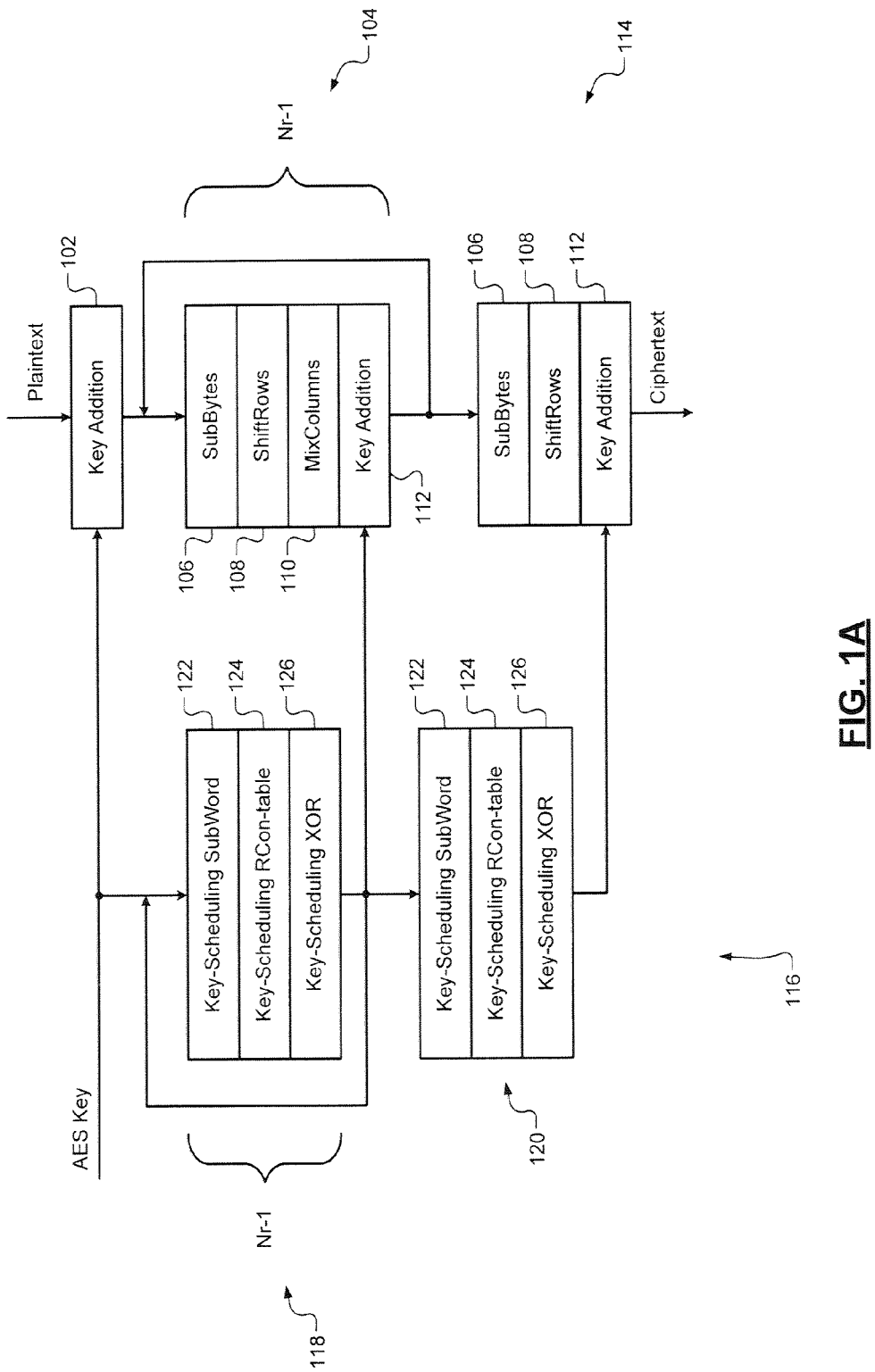
FIG. 1A is a functional data flow diagram that depicts the encoding of a data block according to the advanced encryption standard (AES) according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
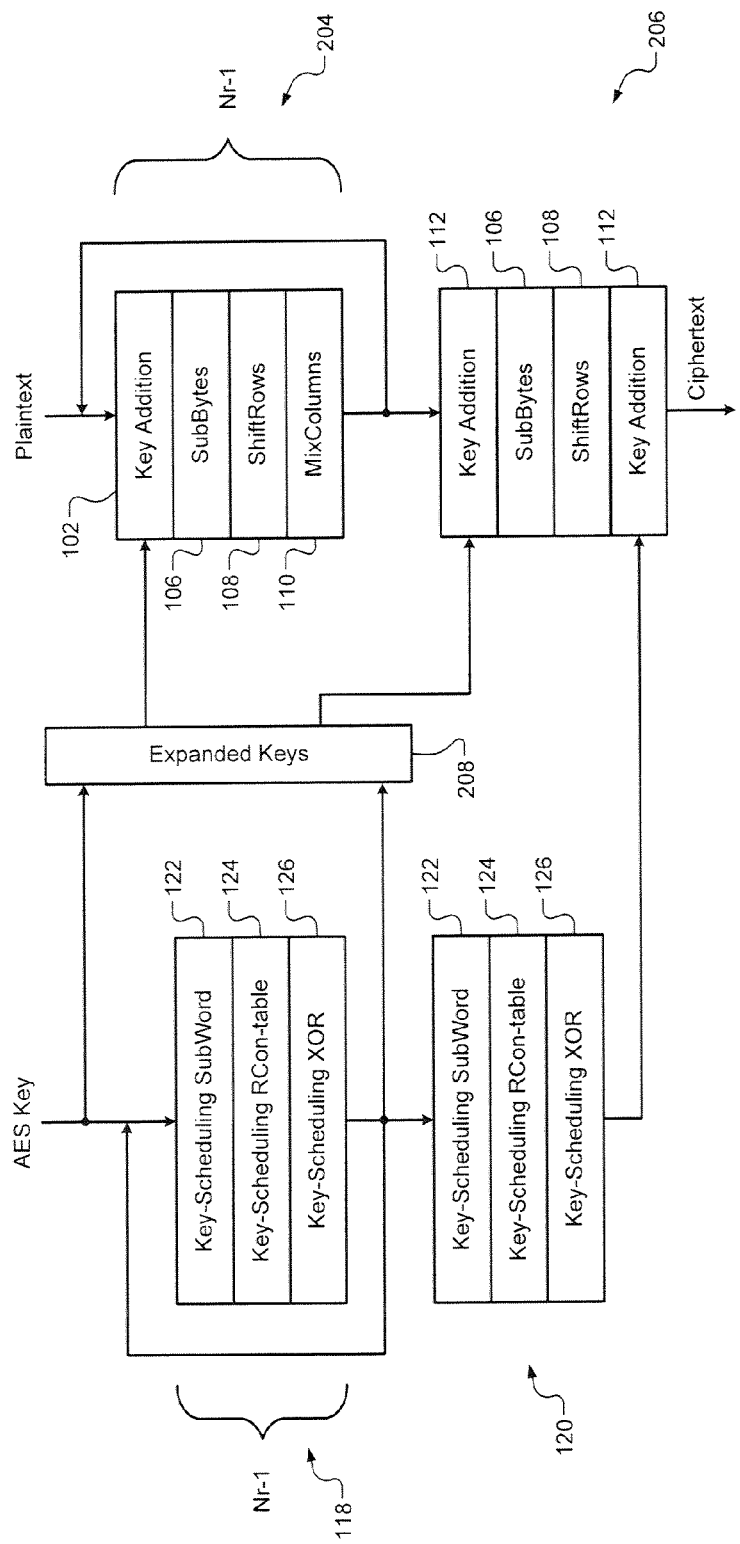
FIG. 2 is a functional data flow diagram that depicts the encoding of a data block according to the advanced encryption standard (AES) according to the principles of the present disclosure.

Referring now to FIG. 2, another implementation of AES encryption is depicted. During encryption, key addition has to be performed before every round, and after the last round. FIG. 1A shows an initial key addition 102 before the multiple-round encryption module 104, which performs key addition 112 after every round except for the last round. FIG. 1A then has an additional key addition 112 after the last round.

By contrast, FIG. 2 shows a multiple-round encryption module 204 that includes key addition 102 that is performed before every round of encryption except the last round. FIG. 2 also includes a final-round encryption module 206 that includes key addition 112 before and after the last round of encryption. The final-round encryption module 206 may be implemented as part of the multiple-round encryption module 204, where control logic disables column mixing 110 during the last round of encryption and applies another round of key addition 112.

FIG. 2 includes an expanded keys module 208 that routes keys from the key expansion module 116 to key addition 102 and 112. For the first round of encryption, the expanded keys module 208 outputs the AES key to key addition 102. In each subsequent round of encryption, except for the last round, the expanded keys module 208 outputs the round key from the multiple-round key expansion module 118 to key addition 102. For the final round, the expanded keys module 204 outputs the last round key of the multiple-round key expansion module 118 to the first key addition 112. The second key addition 112 then receives the output of the final-round key expansion module 120.

The transformation from FIG. 1A, where key addition is performed at the end of each round, to FIG. 2, where key addition is performed at the beginning of each round, may allow a better balance of delays when encryption or decryption is broken into pipeline stages. This is described in more detail below.

Byte substitution 106, shown in FIG. 1A for AES encryption, and also used for decryption, may be performed by a byte substitution module, referred to as an S-box. Because byte substitution is performed on each 8-bit element of the 4×4 AES state, 16 S-boxes may be included to perform byte substitution concurrently for the 16 elements of the AES state.

Figure 1B:
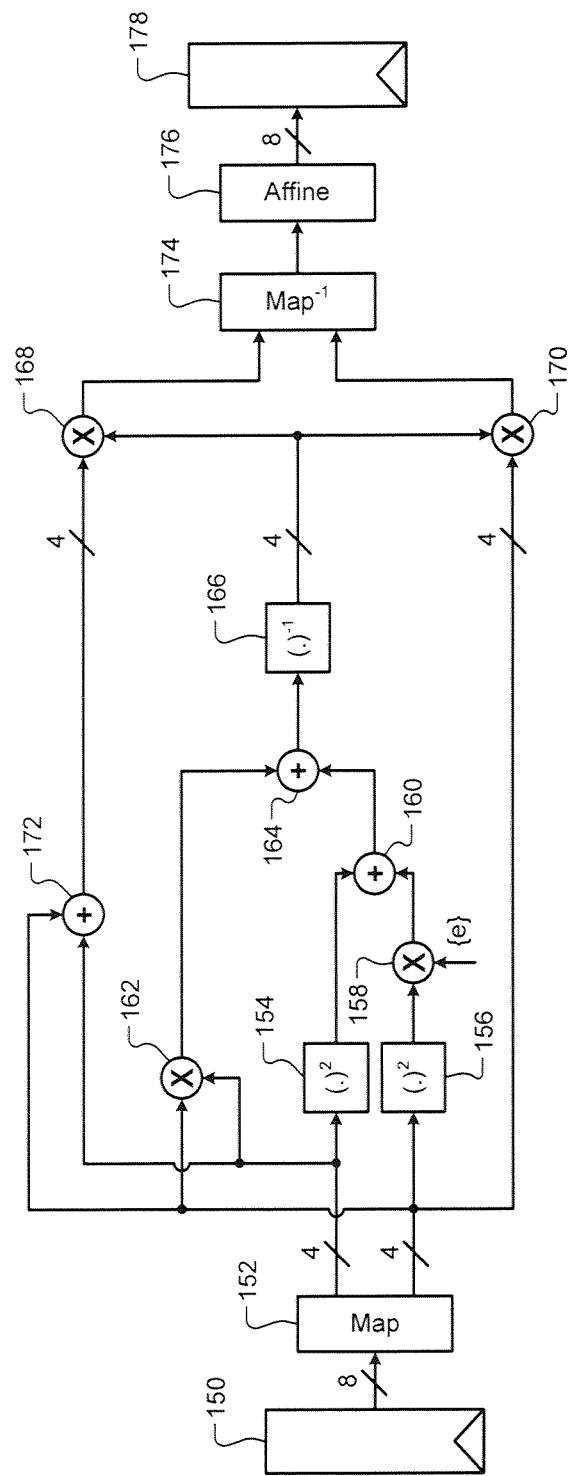
FIG. 1B is a functional block diagram of an implementation of AES byte substitution using Galois Field (GF) operations according to the prior art.

As described above, the S-box replaces an 8-bit element with another 8-bit element. This mapping may be stored in a look-up table (LUT) to quickly determine the replacement element. Alternatively, as shown in FIG. 1B, the replacement element may be calculated using Galois Field (GF) operations. A LUT may be able to determine the replacement element more quickly than mathematical operations.

However, the area (which may be measured in terms of gate count) for storing a LUT may be greater than the area required to implement mathematical operations. Synthesizing a LUT that allows for quicker look-ups may require even more area. When concerned about encryption or decryption speed, an S-box may be implemented for each element of the AES state. With 16 S-boxes, differences in area are even more exaggerated.

S-box speed may be improved by pipelining. LUTs are not particularly susceptible to pipelining, leaving speed improvements from pipelining to S-boxes based on mathematical operations. Introducing pipeline stages involves adding pipeline registers between the pipeline stages. Pipeline registers increase the area for the S-box implementation. However, a pipelined mathematical S-box may still consume less area than a LUT-based S-box.

Figure 3A:
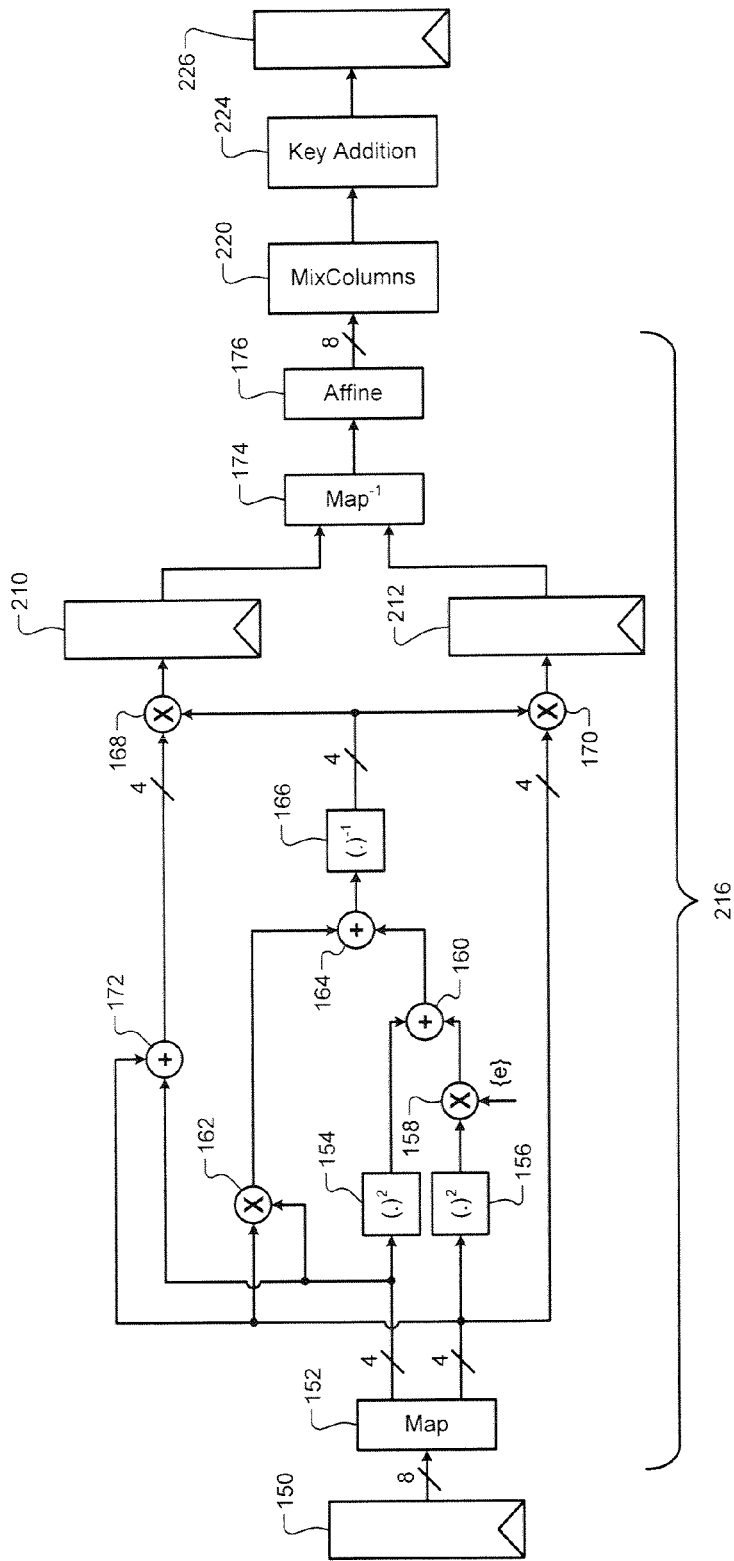
FIGS. 3A-3B are functional block diagrams of pipelined implementations of an S-box using GF operations for AES encryption according to the principles of the present disclosure.
Figure 3B:
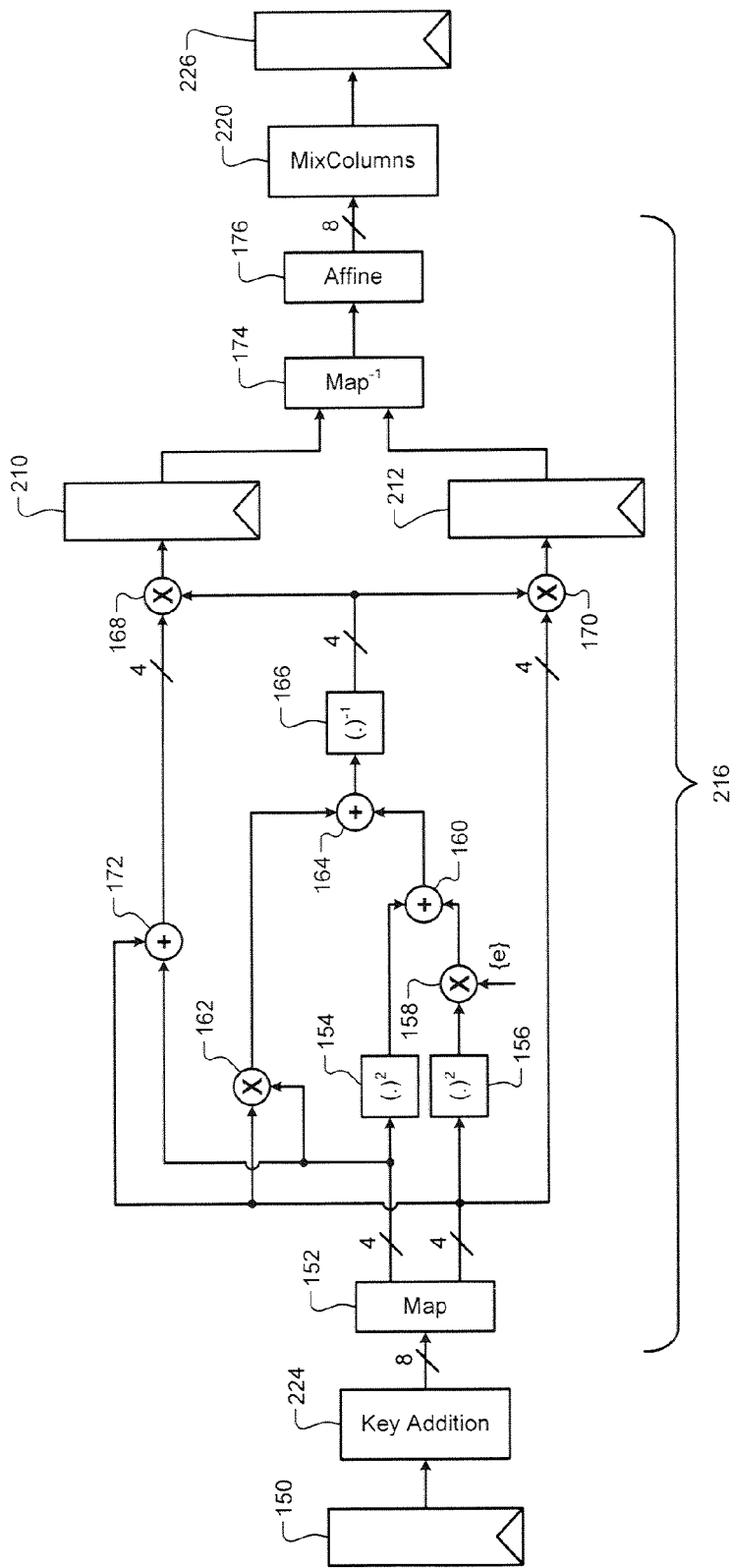
Figure 4A:
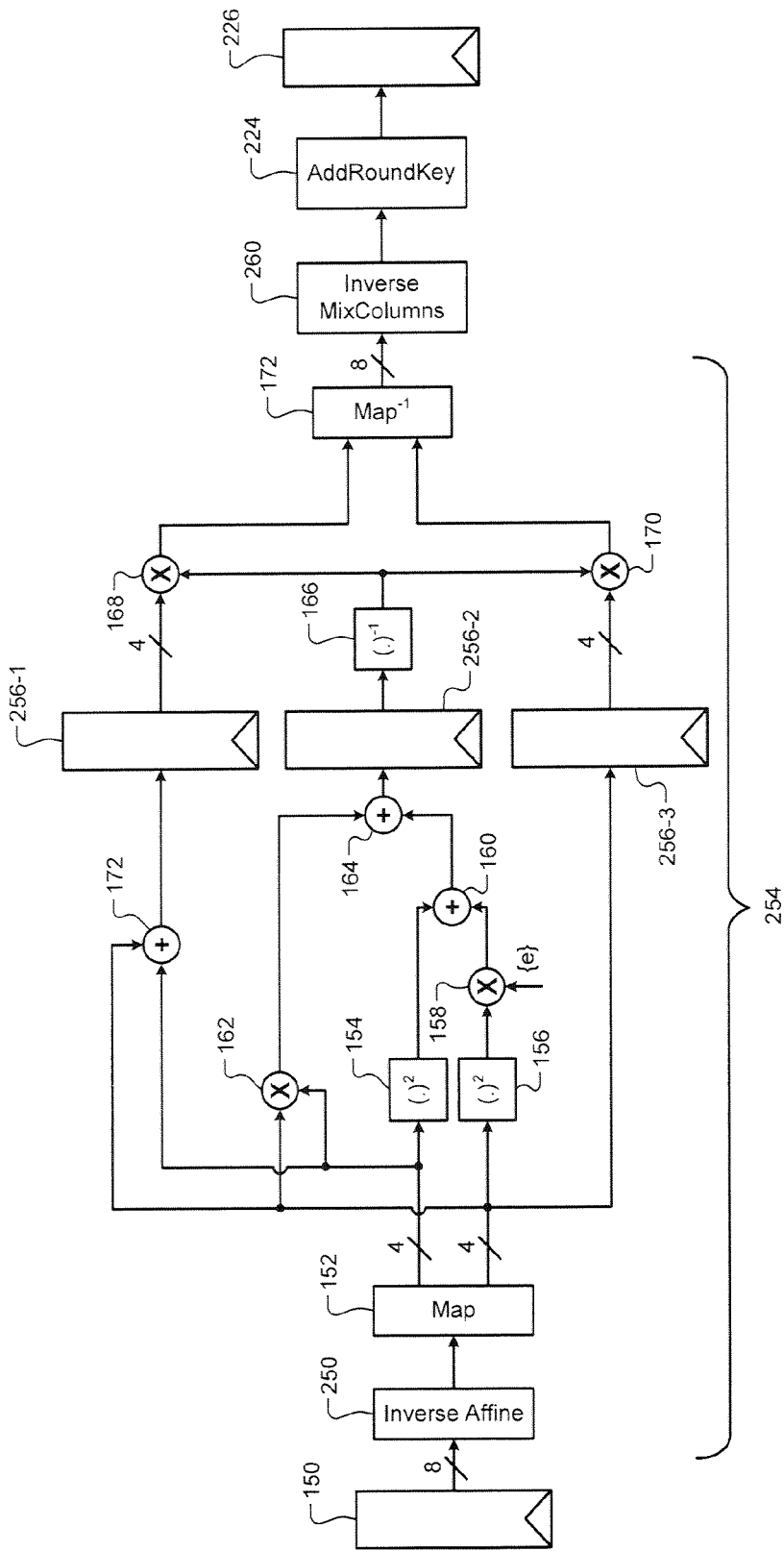
FIGS. 4A-4B are functional block diagrams of pipelined implementations of an S-box using GF operations for AES decryption according to the principles of the present disclosure.
Figure 4B:
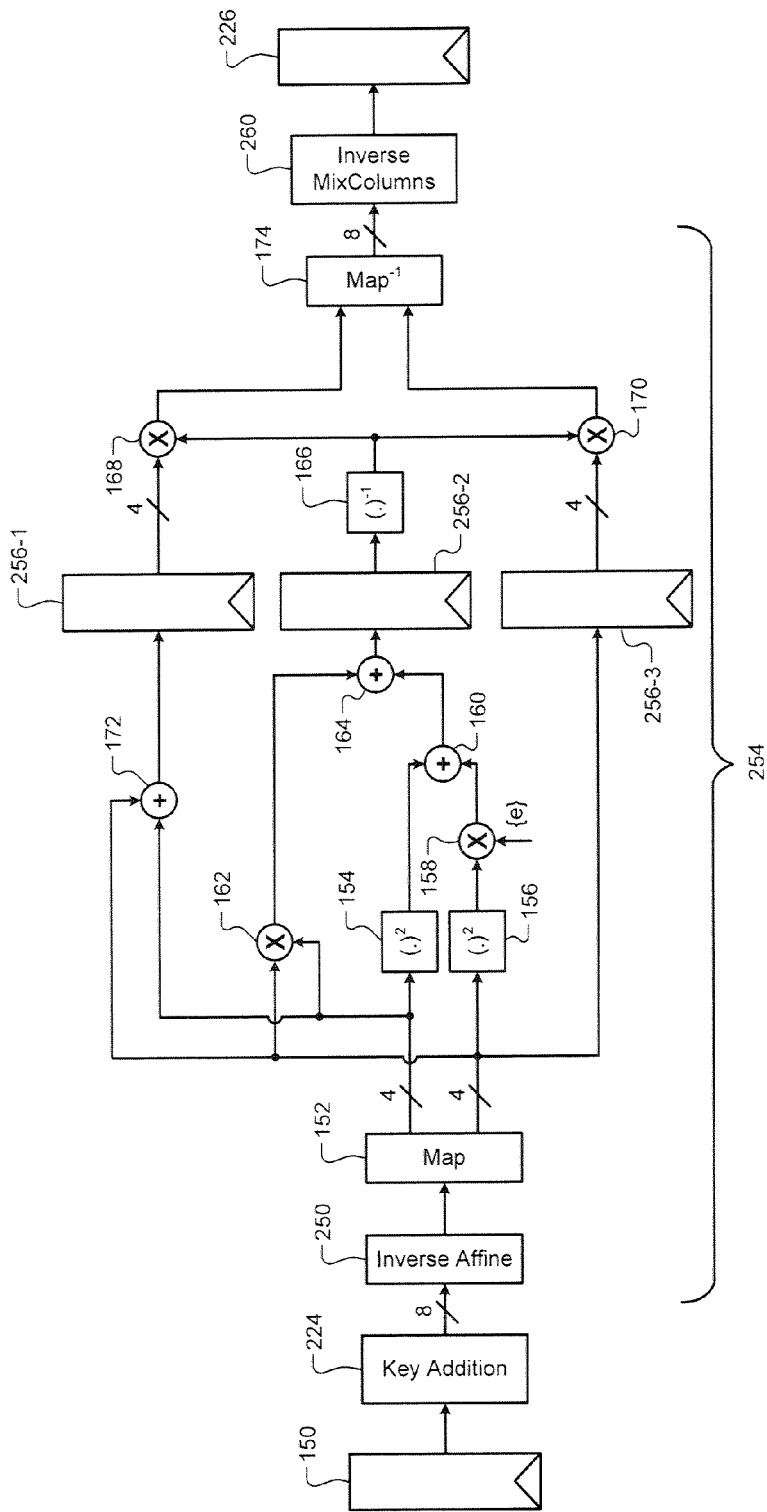
Figure 5A:
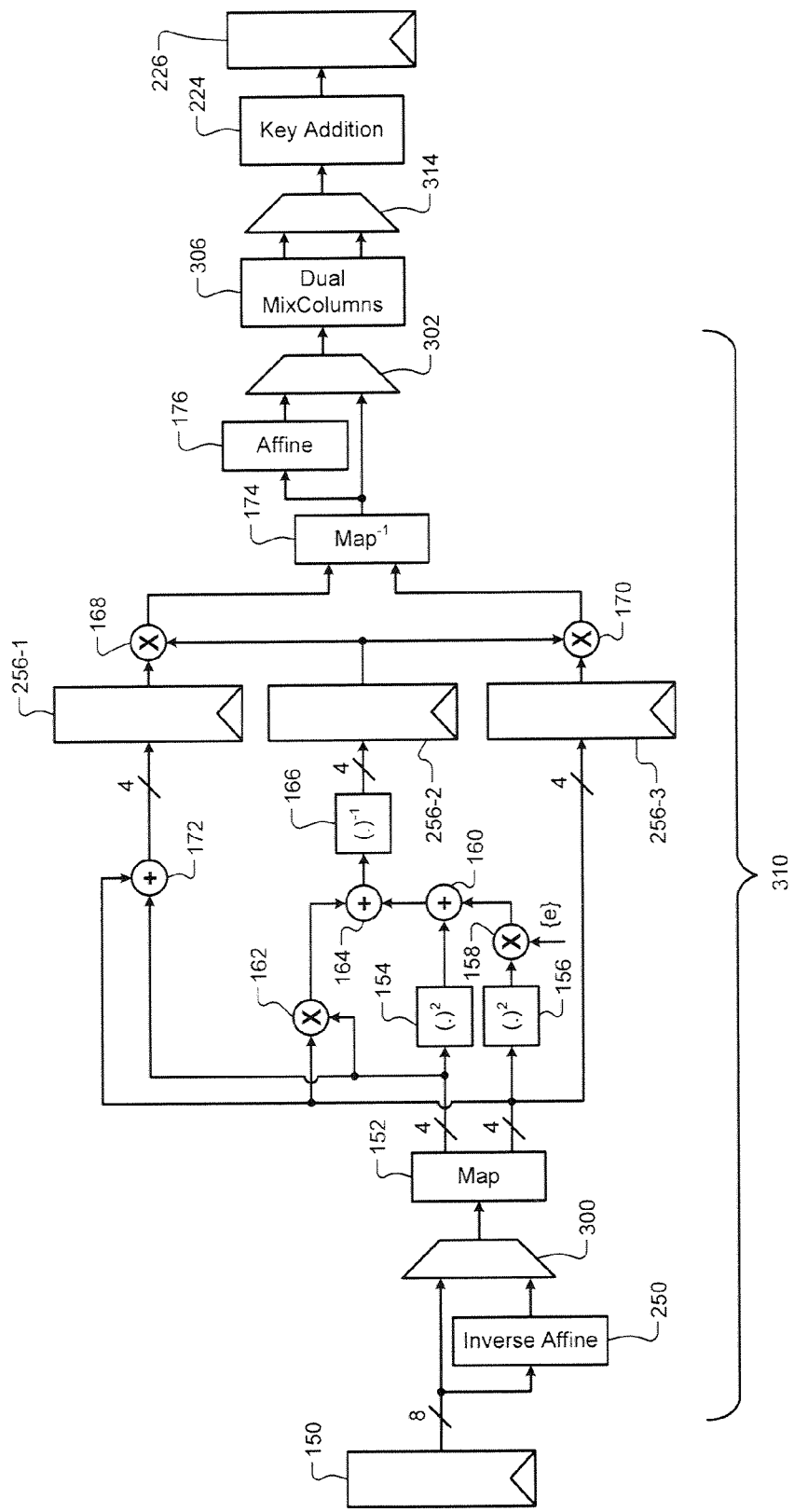
FIGS. 5A-5B are functional block diagrams of pipelined implementations of an S-box using GF operations for either encryption or decryption according to the principles of the present disclosure.
Figure 5B:
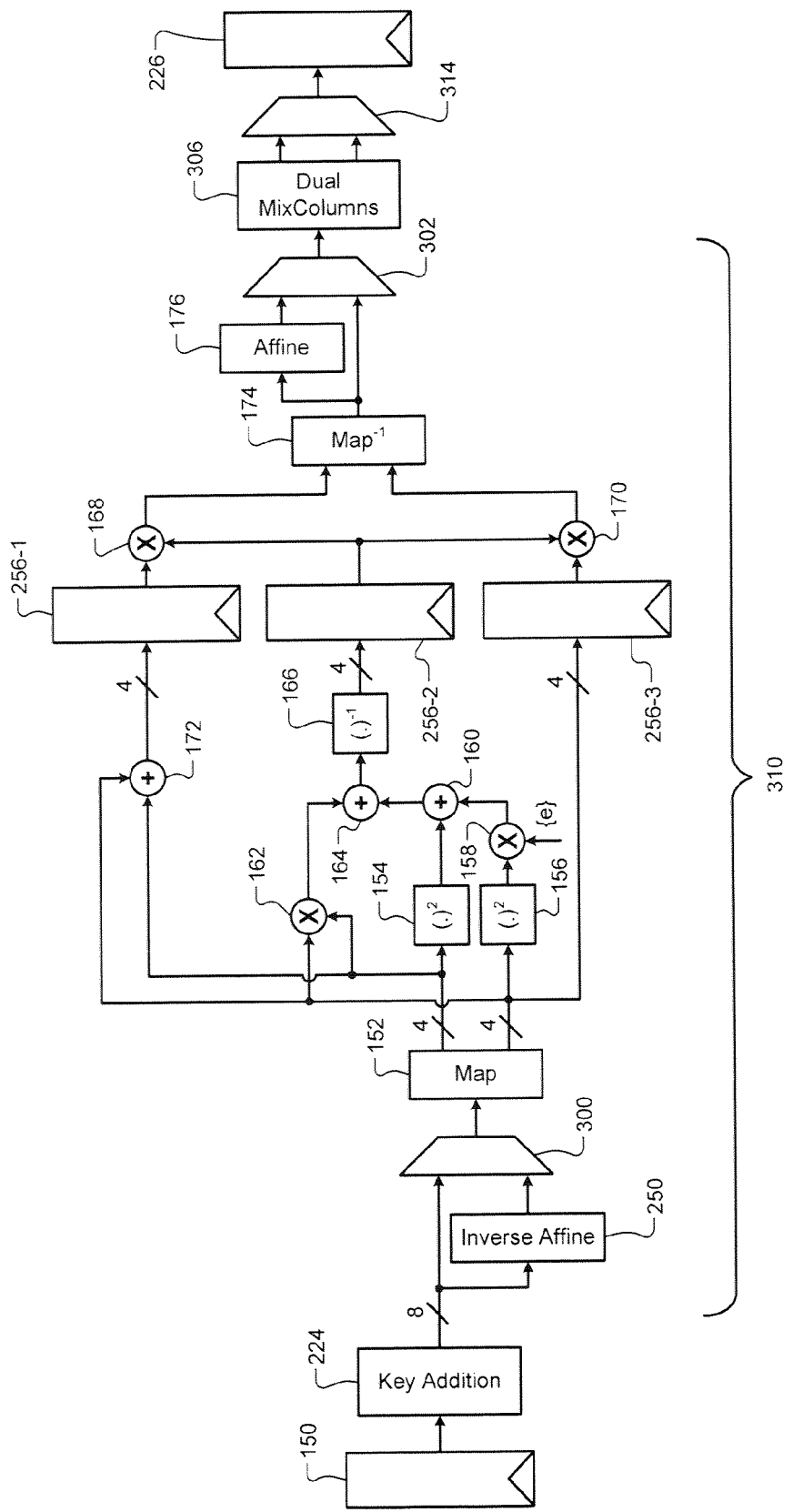

FIGS. 3A-3B depict an S-box implementation with two pipeline stages. The second stage of the S-box is combined with additional AES encryption functions to balance the pipeline. FIGS. 4A-4B depict a similar 2-stage implementation for AES decryption. If encryption and decryption do not have to be performed simultaneously, a 2-stage implementation that can perform either may consume less area than having one for encryption and one for decryption. FIGS. 5A-5B depict one exemplary implementation of a 2-stage S-box that can perform encryption or decryption.

Figure 6A:
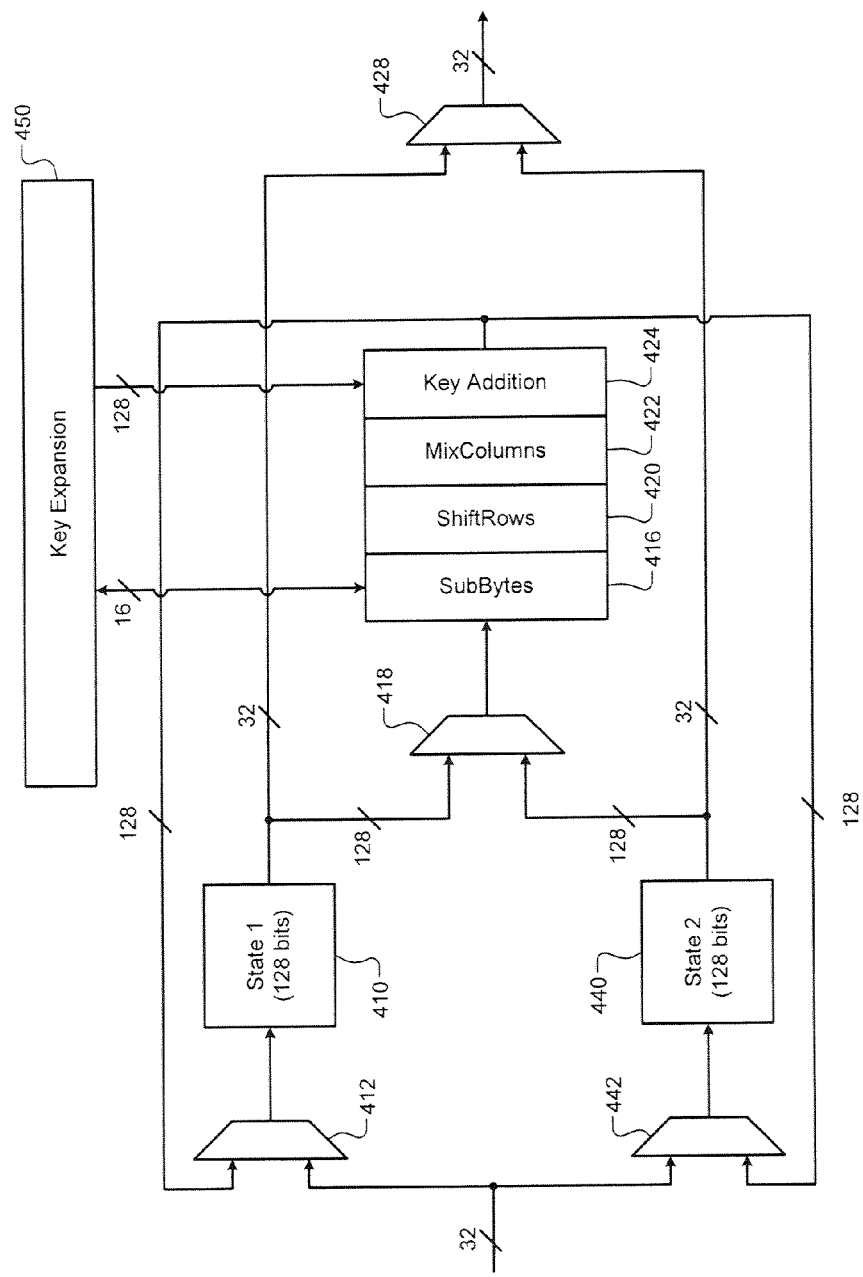
FIGS. 6A-6B are functional block diagrams of top level architectures used for AES encryption and decryption with a non-pipelined S-box according to the principles of the present disclosure.
Figure 6B:
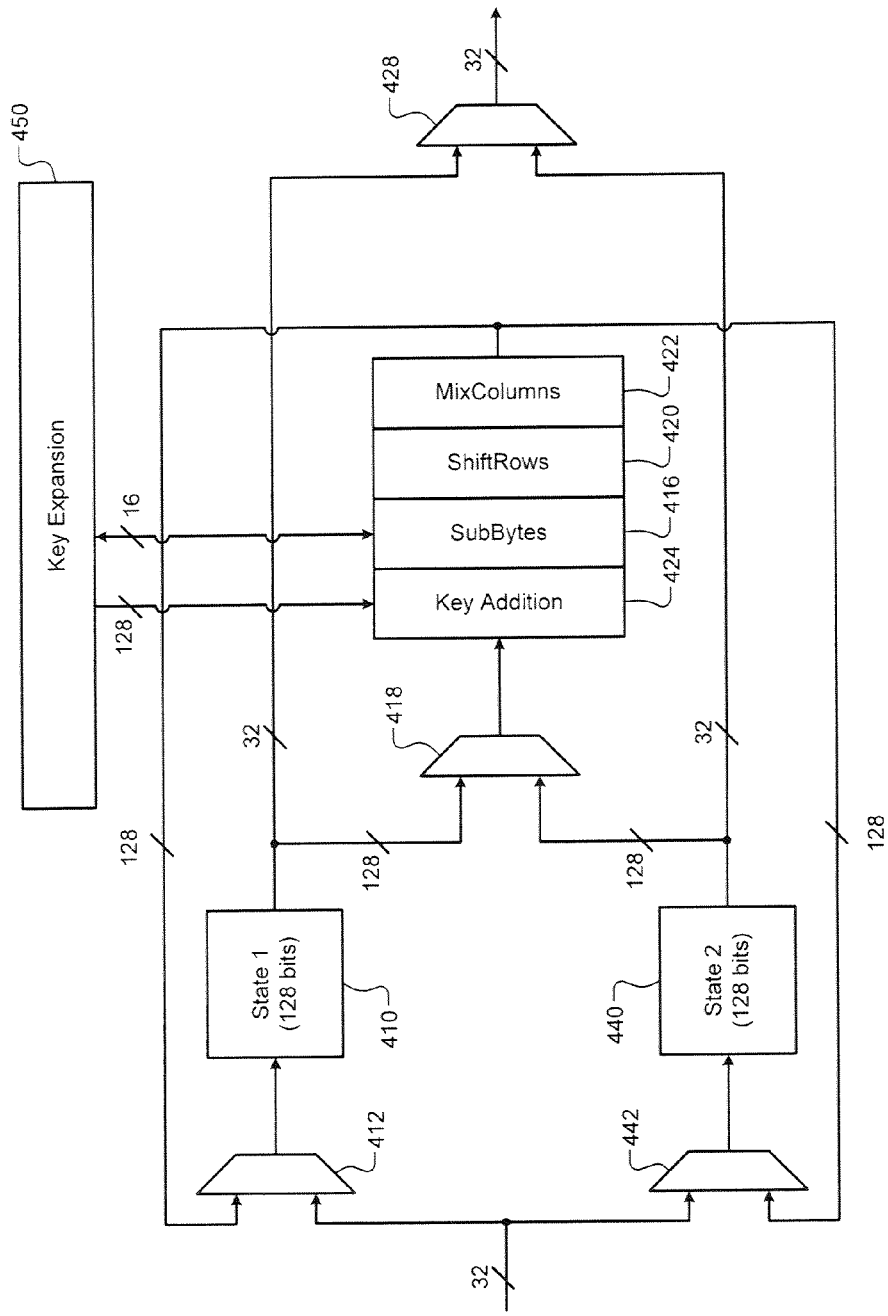
Figure 7A:
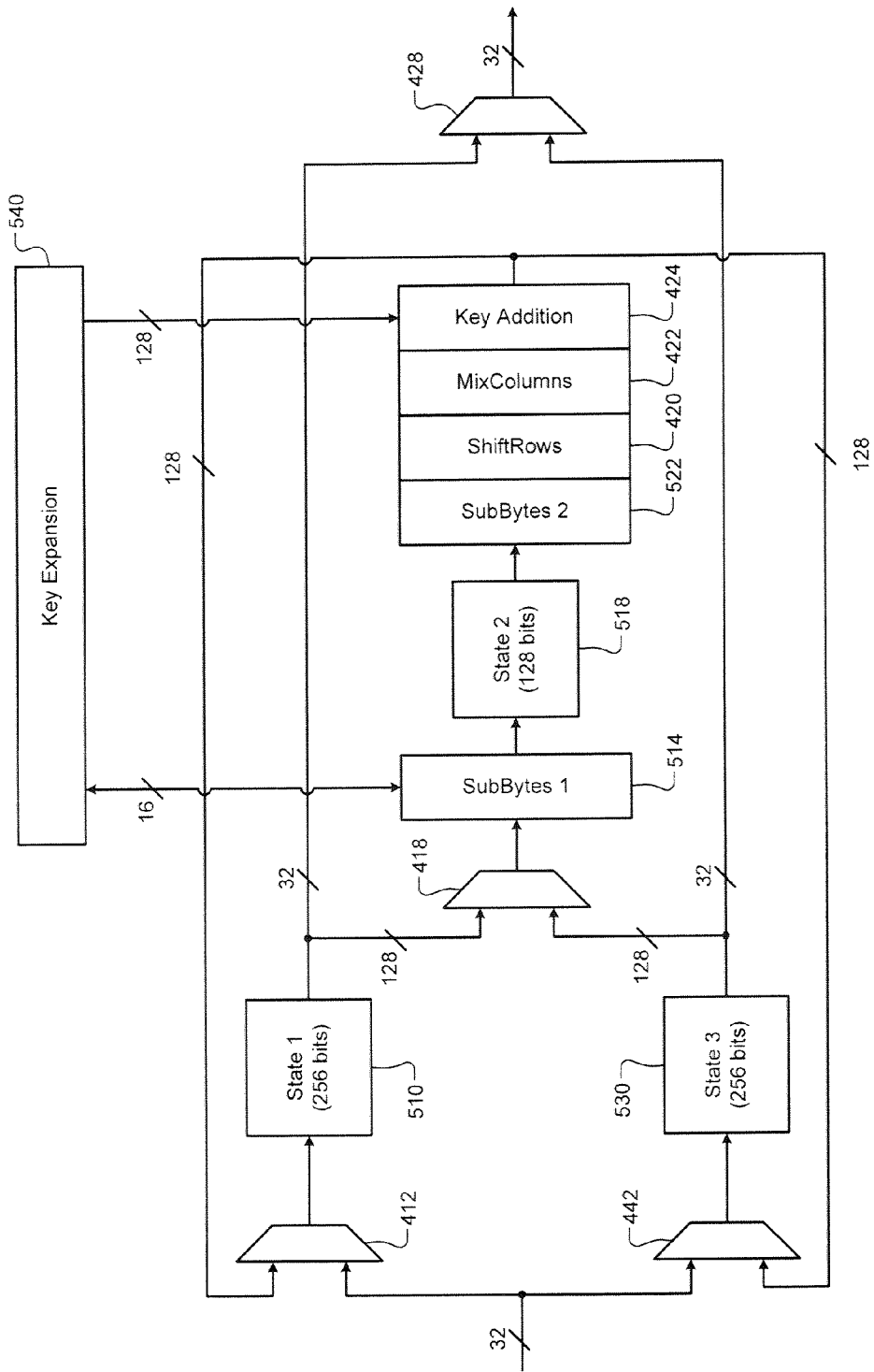
FIG. 7A is a functional block diagram of an exemplary top level architecture for performing encryption or decryption with a pipelined S-box according to the principles of the present disclosure.
Figure 7B:
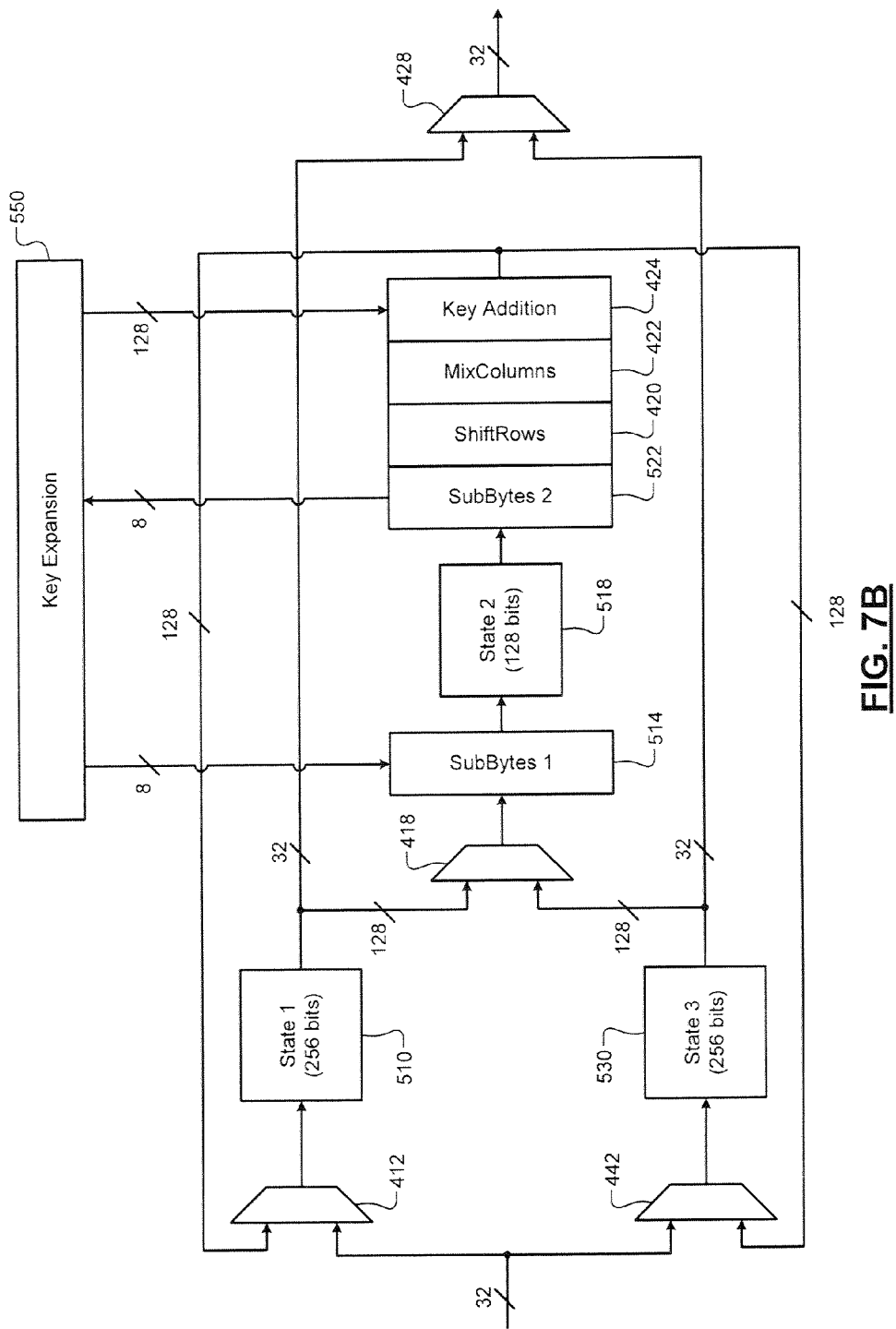
FIGS. 7B-7C are functional block diagrams similar to FIG. 7A that have another key expansion module used for offline key expansion according to the principles of the present disclosure.
Figure 8A:
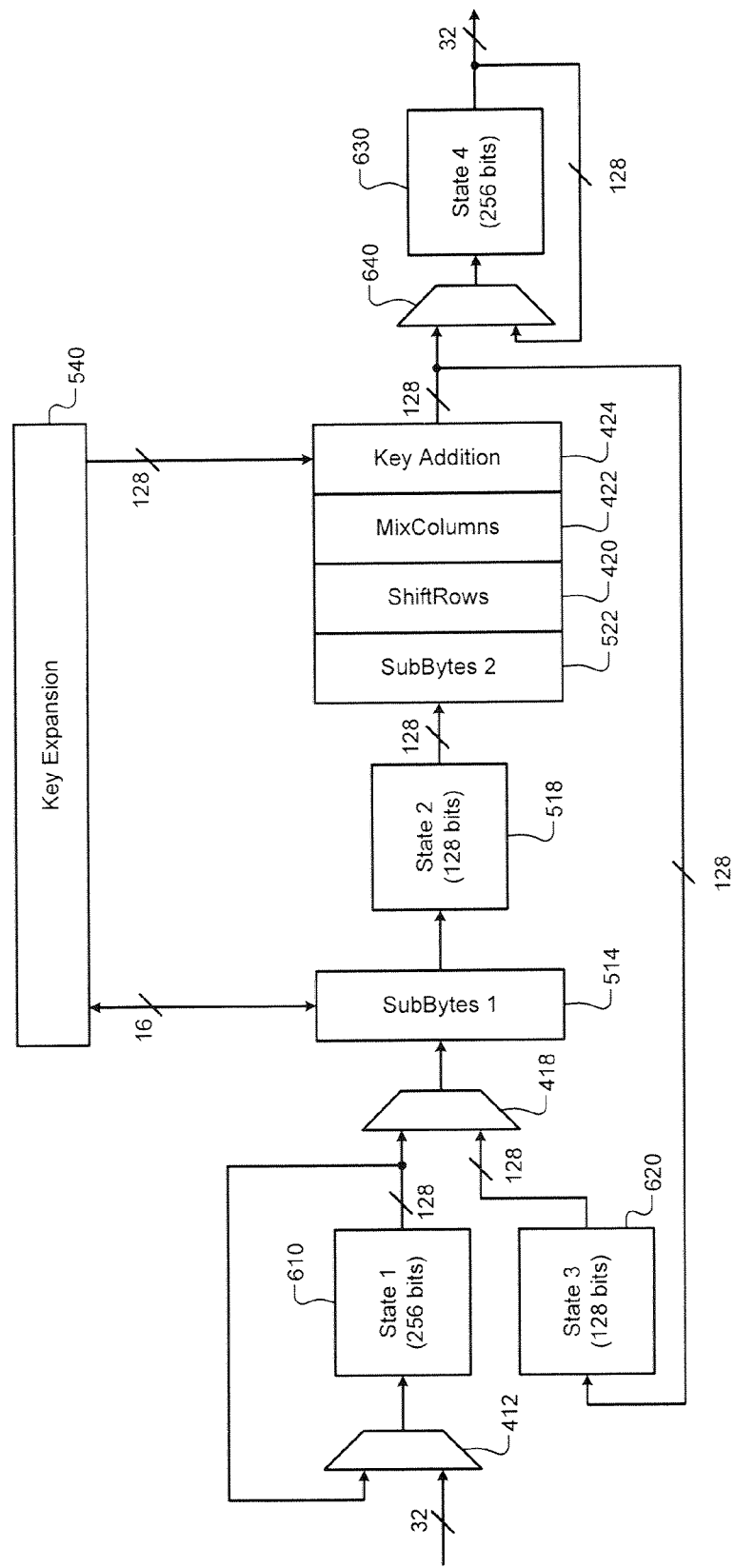
FIG. 8A is a functional block diagram of an exemplary implementation of a top level architecture using a pipelined 3-box according to the principles of the present disclosure.
Figure 8B:
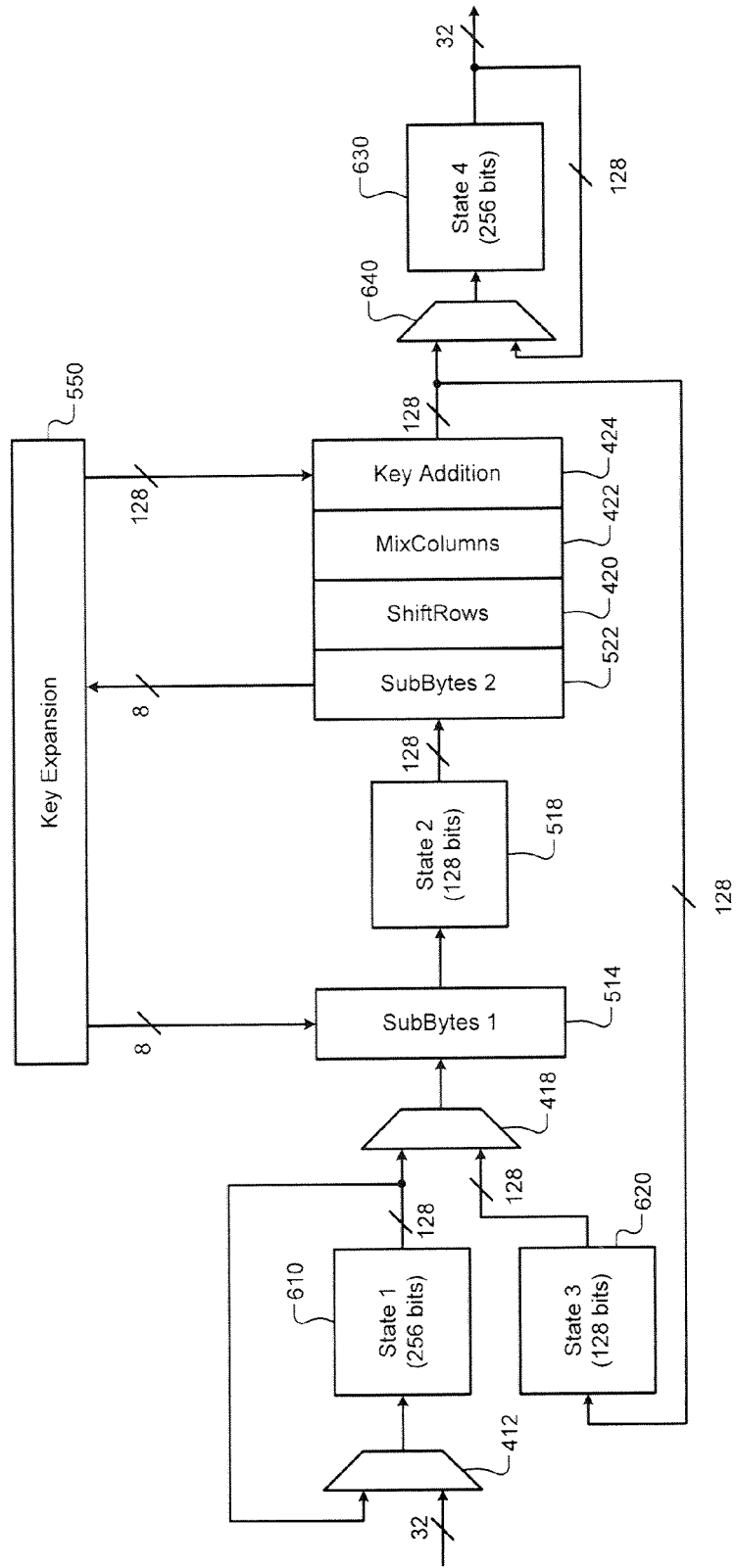
FIGS. 8B-8C are functional block diagrams similar to FIG. 8A that have another key expansion module used for offline key expansion according to the principles of the present disclosure.

FIGS. 6A-6B depict a top level architecture that can be used with the math-based S-box shown in FIG. 2 or with a LUT-based S-box. FIG. 7A depicts a top level architecture that can be used with the pipelined S-boxes of FIGS. 3-5. FIG. 8A depicts another top level architecture that can be used with the pipelined S-boxes of FIGS. 3-5. FIGS. 7B and 8B depict another approach for key expansion for the architectures of FIGS. 7B and 8B, respectively.

Figure 9A:
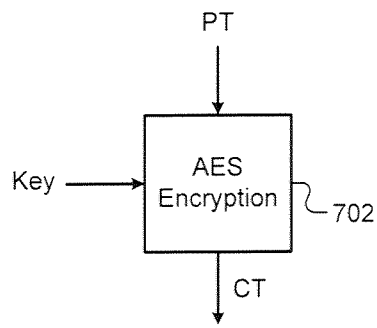
FIGS. 9A and 9B are functional block diagrams of AES encryption and decryption operating in electronic codebook (ECB) mode according to the principles of the present disclosure.
Figure 9B:
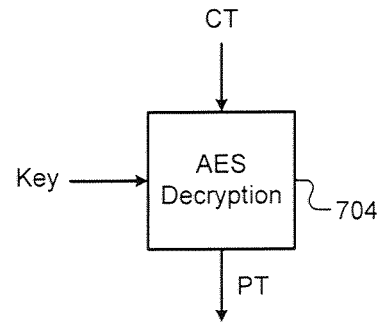

FIGS. 9A and 9B show AES encryption and decryption, respectively, operating in electronic codebook (ECB) mode. In ECB mode, the input of the AES encryption is plaintext, the output is ciphertext, and the key is input directly to the AES encryption. This bare form of AES encryption may be susceptible to attack. Consequently, AES encryption is often used in other modes where additional data is applied before or after AES encryption.

Figure 10A:
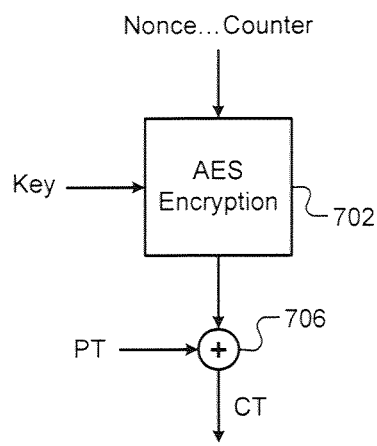
FIGS. 10A and 10B are functional block diagrams of AES encryption and decryption in counter mode according to the principles of the present disclosure.
Figure 10B:
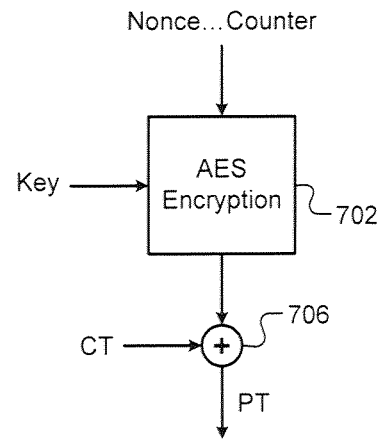
Figure 11A:
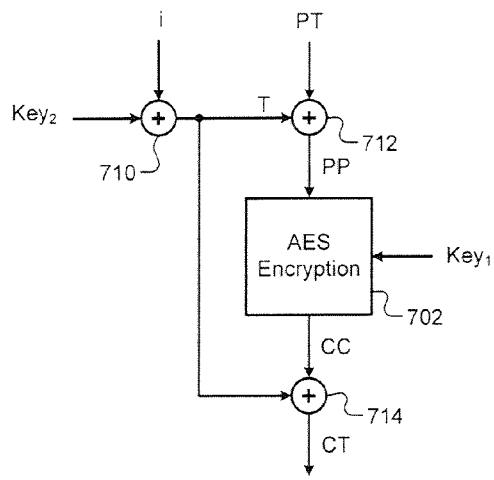
FIGS. 11A and 11B are functional block diagrams of AES encryption and decryption in LRW mode according to the principles of the present disclosure.
Figure 11B:
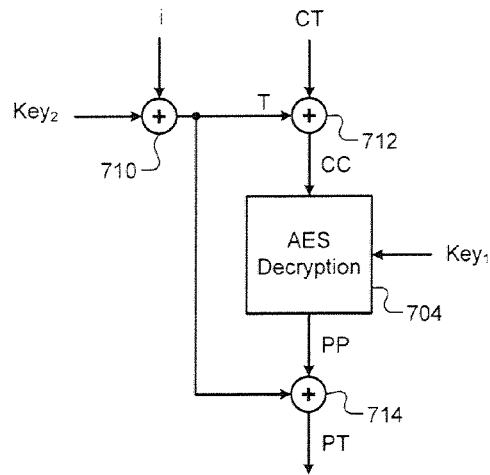
Figure 12A:
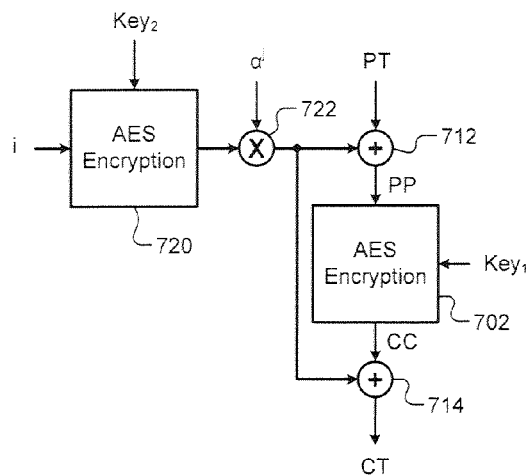
FIGS. 12A and 12B are functional block diagrams of AES encryption and decryption in XTS mode according to the principles of the present disclosure.
Figure 12B:
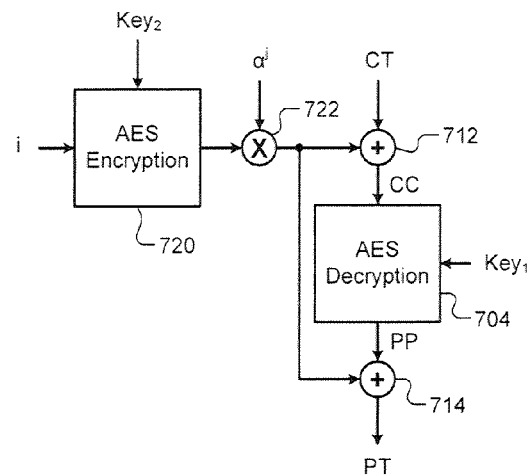

FIGS. 10A and 10B depict encryption and decryption in a counter mode. FIGS. 11A and 11B depict AES operating in LRW mode (named after the inventors Liskov, Rivest, and Wagner). FIGS. 12A and 12B depict the current IEEE P1619 standard mode of XEX (XOR-encrypt-XOR)-based tweaked codebook mode (TCB) with ciphertext stealing (CTS), referred to as XTS. FIGS. 13, 14, and 15 depict how the top level architectures of FIGS. 6, 7B, and 8B, respectively, can be used in counter mode.

Referring now to FIG. 3A, a functional block diagram of a pipelined implementation of an S-box using mathematical operations is presented. Elements in FIG. 3A that are similar to elements of FIG. 1B are identified by the same reference numerals. First and second pipeline registers 210 and 212 each store 4-bit values representing elements in GF(16). The outputs of the third and fourth multipliers 168 and 170 are stored in the first and second pipeline registers 210 and 212, respectively.

Outputs of the first and second pipeline registers 210 and 212 are transmitted to the inverse mapping module 174, which composes the two GF(16) values into a single GF(256) element. The affine module 176 then applies an affine transform to the GF(256) element. The modules from the mapping module 152 to the affine module 176 form an S-box 216. The S-box 216 may be repeated 16 times to concurrently process each of the 16 elements of the AES state.

The pipeline registers 210 and 212 define a two-stage pipeline by storing values from the first stage (to the left of the registers 210 and 212) and outputting values to the second stage (to the right of the registers 210 and 212). The inversion module 166 may have the longest delay of the modules in the S-box 216. By placing the inversion module 166 in the first pipeline stage, the first pipeline stage may have a longer delay than the second pipeline stage.

One goal of pipeline design is to equalize the delay in each stage, as the longest stage delay determines the speed of the entire pipeline. Placing the third and fourth multiplication modules 168 and 170 in the first stage further increases the delay of the first stage. However, if they were placed in the second stage, the pipeline registers 210 and 212 would have to store an additional 4-bit value.

To balance the delay in the first stage, the second stage can incorporate other AES operations. For example, a row shifting module (not shown), a column mixing module 220, and a key addition module 224 are incorporated into the second stage in FIG. 3A. This provides for a better balance of delays in the first and second stages of the pipeline, and allows an entire round of AES encryption to be performed in two clock cycles.

The output of the affine module 176 is processed by the row shifting module. The row shifting module operates on the outputs of S-boxes 216, and cyclically shifts each element one position over in each row of the AES state. The row shifting module is not shown in FIG. 3A because simply shifting element positions can be accomplished by routing, with no additional logic.

The AES state, as reordered by row shifting, is processed by a column mixing module 220. The column mixing module 220 operates on four elements of the AES state as a group, as described above for column mixing 110 in FIG. 1A. There may be four copies of the column mixing module 220 to operate on each of the four columns of the AES state concurrently.

A key addition module 224 XORs all 16 elements of the AES state (128 bits) output from the column mixing modules 220 with the expanded key for this round of AES encryption. The key addition module 224 may therefore include 128 single-bit XOR modules that operate on each bit of the AES state. The output of the key addition module 224 is stored in an output register 226. The contents of the output register 226 may be fed back into the S-box 216 for further rounds of AES processing.

Referring now to FIG. 3B, the functional block diagram of FIG. 3A is modified based on the transformation from FIG. 1A to FIG. 2. The key addition module 224 is placed in front of the mapping module 152. After the key addition module 224 performs key addition, each 8-bit element of the resulting AES state is processed by the S-box 216.

By moving the key addition module 224 before the mapping module 152, the first stage delay is increased and the second stage delay is increased. This may better balance the delays of the first and second stages. Further balancing may be performed by moving the third multiplication module 168 and the fourth multiplication module 170 to the right of the pipeline registers 210 and 212, such as is shown in FIGS. 5A-5B.

Referring now to FIG. 4A, a pipelined implementation of AES decryption using Galois Field (GF) operations is presented. Decryption is performed similarly to the encryption implementation shown in FIG. 3A. The storage register 150 outputs an 8-bit element of the AES state to an inverse affine module 250. The inverse affine module 250 applies an inverse affine transform to the 8-bit element and outputs the result to the mapping module 152.

Pipeline registers 256-1, 256-2, and 256-3 receive the output of the third summation module 172, the output of the second summation module 164, and the second output of the mapping module 152, respectively. The pipeline registers 256-1, 256-2, and 256-3 output these values to the third multiplication module 168, the inversion module 166, and the fourth multiplication module 170, respectively. The inversion module 166 is now located in the second pipeline stage to compensate for the added delay in the first pipeline stage created by the inverse affine module 250.

The modules from the inverse affine module 250 to the inverse mapping module 174 form an inverse S-box 254. Outputs from the inverse mapping modules 174 of 16 copies of the inverse S-box 254 are received by an inverse column mixing module 260 via row shifting routing (not shown). The inverse column mixing module 260 operates similarly to the column mixing module 220. The key addition module 224 operates on the outputs of the inverse column mixing modules 260. FIG. 4B depicts a functional block diagram similar to that of FIG. 4A, where the key addition module 224 is placed in front of the inverse affine module 250.

Referring now to FIG. 5A, a functional block diagram of an exemplary Galois Field-based pipelined AES implementation that can be used for either encryption or decryption is presented. The storage register 150 outputs an 8-bit element of the AES state to the inverse affine module 250 as well as directly to a first multiplexer 300.

For encryption, the first multiplexer 300 selects the element output from the storage register 150. For decryption, the first multiplexer 300 selects the value from the inverse affine module 250. The first multiplexer 300 outputs the selected value to the mapping module 152. The first multiplexer 300 and the inverse affine module 250 together form a selective inverse affine module. The modules between the mapping module 152 and the inverse mapping module 174 are similar to that shown in FIG. 4A.

The output of the inverse mapping module 174 is output to the affine module 176 as well as directly to a second multiplexer 302. The second multiplexer 302 selects the output of the affine module 176 during encryption, and the output of the inverse mapping module 174 during decryption. The selected value is output from the second multiplexer 302 to a dual column mixing module 306 via row shifting routing (not shown). The affine module 176 and the second multiplexer 302 together form a selective affine module.

The modules between and including the inverse affine module 250 and the second multiplexer 302 form a hybrid S-box 310 that can be used for encryption or decryption. The outputs of the hybrid S-boxes 310 are processed by the dual column mixing module 306. The dual column mixing module 306 produces an output similar to that of the column mixing module 220 as well as an output similar to the inverse column mixing module 260.

An exemplary implementation of the dual column mixing module 306 is discussed in "Very Compact FPGA Implementation of the AES Algorithm," Pawel Chodowiec & Kris Gaj, Proceedings of Cryptographic Hardware and Embedded Systems 2003, Lecture Notes in Computer Science Vol. 2779/2003, the disclosure of which is incorporated herein by reference in its entirety.

A third multiplexer 314 selects the column mixing output from the dual column mixing module 306 during encryption and the inverse column mixing output during decryption. The third multiplexer 314 and the dual column mixing module 306 together form a normal/inverse column mixing module. Because the dual column mixing module 306 and the third multiplexer 314 operate on four elements of the AES state simultaneously, there may be four copies of the dual column mixing module 306 and the third multiplexer 314. The key addition module 224 then XORs the AES state with the expanded key corresponding to the current round of encryption or decryption. FIG. 5B depicts a functional block diagram similar to that of FIG. 5A, where the key addition module 224 is placed in front of the inverse affine module 250.

Referring now to FIG. 6A, a functional block diagram of a top level architecture used for AES encryption or decryption with a non-pipelined S-box is presented. The non-pipelined S-box may use Galois Field operations, such as is shown in FIG. 1B, or may use a LUT. While AES operates on 128-bit blocks, FIG. 6A depicts an architecture that can accept an arbitrary number of bits during each clock cycle.

The number of bits received may be greater or less than 128. For example only, FIG. 6A depicts an architecture where 32 bits are received in a clock cycle and 32 bits are output in a clock cycle. This architecture allows the 128-bit AES engine to operate transparently in a 32-bit datapath.

A first state module 410 contains storage for a 128-bit copy of the AES state. The first state module 410 receives 32 input bits at a time via a first multiplexer 412. After four clock cycles where 32-bit inputs have been received, a full 128-bit AES state is present. The first state module 410 can then output the AES state for a first round of AES processing. The 128-bit output of the first state module 410 is received by a byte substitution module 416 via a second multiplexer 418.

The byte substitution module 416 may include 16 copies of an S-box to perform byte substitution on each of the 16 elements of the received AES state. A row shifting module 420 cyclically shifts each element of the AES state one position over within each row. As described above, this may be accomplished through routing with no additional logic.

Each column of the AES state is then processed by a column mixing module 422. A key addition module 424 adds a received key to the AES state. The output of the key addition module 424 is then fed back to the first state module 410 via the first multiplexer 412. For purposes of illustration only, the key size used in this disclosure is 128 bits. However, a longer key length may be used, such as 192 bits or 256 bits.

For a key length of 128 bits, ten rounds of processing are performed. The first state module 410 therefore outputs the new AES state to the byte substitution module 416 via the second multiplexer 418 for a second round of processing. The output of the key addition module 424 is then fed back to the first state module 410 by the first multiplexer 412. This continues for ten rounds of processing.

Once the first state module 410 contains the final encrypted AES state, the first state module 410 can begin outputting the AES state via a third multiplexer 428 in groups of 32 bits. During the ten rounds of processing, ten more 32-bit inputs may have been received. A second state module 440 may include storage for a 128-bit AES state and may receive the next four 32-bit inputs via a fourth multiplexer 442.

However, because receiving 128 bits takes only four clock cycles, while AES processing of the 128 bits may take ten clock cycles, 32-bit inputs may be restricted to four out of ten cycles. Hardware flow control may be used to regulate this input data rate.

When the first state module 410 contains the final encrypted AES state, the second state module 440 will have received the next 128-bit AES block for processing. The second multiplexer 418 can then select the AES state from the second state module 440 to be output to the byte substitution module 416. Meanwhile, the third multiplexer 428 will be outputting 32 bits of the AES state from the first state module 410 per clock cycle.

A key expansion module 450 provides a round key to the key addition module 424 for each round of encryption. The keys for each round are expanded from an AES key using a specified key schedule. When the AES key changes frequently, the key expansion may be performed at the same time as encryption. The round key may be determined just prior to the encryption round receiving it.

In applications such as disk encryption, each disk partition may be encrypted with a single AES key. If changes between partitions are fairly infrequent, the key expansion module 450 may expand the AES key for that partition before that partition is accessed and encryption/decryption is performed. This is referred to as offline key expansion.

For offline key expansion, the key expansion module 450 may be able to use the byte substitution module 416 before encryption/decryption begins. An 8-bit element is transmitted to the byte substitution module 416 and a replacement 8-bit element is returned. With a rapidly, changing key, however, the key expansion module 450 may implement its own byte substitution functionality to allow for concurrent key expansion. To perform decryption, the architecture of FIG. 6A may be modified by replacing the column mixing module 422 with an inverse column mixing module. The byte substitution module 416 may also be modified for decryption. FIG. 6B depicts a functional block diagram similar to that of FIG. 6A, where the key addition module 424 is placed in front of the byte substitution module 416.

Referring now to FIG. 7A, a functional block diagram of an exemplary top level architecture for performing encryption or decryption with a pipelined S-box is presented. A first state module 510 can store 256 bits, which allows for first and second AES states to be stored. When the input bus is 32 bits, the first state module 510 receives each 32-bit input via the first multiplexer 412.

The first state module 510 outputs one of the stored 128-bit AES states to a first byte substitution module 514. An output of the first byte substitution module 514 is latched by a second state module 518. The second state module 518 outputs the received 128-bit value to a second byte substitution module 522. The first and second byte substitution modules 514 and 522 and the second state module 518 together form an S-box.

For example only, the S-box may be implemented as shown at 216 in FIG. 3A for encryption, at 254 in FIG. 4A for decryption, or at 310 in FIG. 5A for either encryption or decryption. When using the S-box 254 of FIG. 4A or the S-box 310 of FIG. 5A, the second state module 518 may store 192 bits because for each 8-bit element, three 4-bit intermediate values are stored in pipeline registers.

The output of the second byte substitution module 522 is processed by the row shifting module 420, which is then output to the column mixing module 422, and then to the key addition module 424. The output of the key addition module 424 may be stored back into the first state module 410 via the first multiplexer 412.

For decryption, the column mixing module 422 may be replaced by an inverse column mixing module. To allow for either encryption or decryption, the column mixing module 422 may be implemented using a dual column mixing module and a multiplexer, as described in more detail in FIG. 5A.

The first byte substitution module 514 forms the first stage in a pipeline. The second state module 518 serves as the pipeline register. The second byte substitution module 522, the row shifting module 420, the column mixing module 422, and the key addition module 424 form a second stage of the pipeline.

The first state module 510 outputs the first stored AES state to the first pipeline stage. The resulting output of the first pipeline stage is stored by the second state module 518. The second state module 518 then outputs the stored AES state to the second pipeline stage. Meanwhile, the first state module 510 can output the second stored AES state to the first pipeline stage. The output of the second pipeline stage is stored by the first state module 510, while the output of the first pipeline stage is stored by the second state module 518.

In this way, during one clock cycle, the first pipeline stage operates on one AES state while the second pipeline stage operates on a second AES state. Therefore, after twenty clock cycles, ten rounds of AES encryption or decryption can be performed on each of two AES states. Upon completion of the ten rounds, the first state module 510 can output both AES states, 32 bits at a time, via the third multiplexer 428.

While the AES states are being processed from the first state module 510, a third state module 530 may have been receiving 32-bit inputs via the fourth multiplexer 442. As the last round of encryption or decryption is performed for the AES states stored in the first state module 510, the third state module 530 can begin outputting its first and second stored AES states to the first byte substitution module 514 via the second multiplexer 418.

A key expansion module 540 provides each round key to the key addition module 424. If offline key expansion is possible, the key expansion module 540 may communicate with the first byte substitution module 514 to provide byte substitution functionality.

Figure 7C:
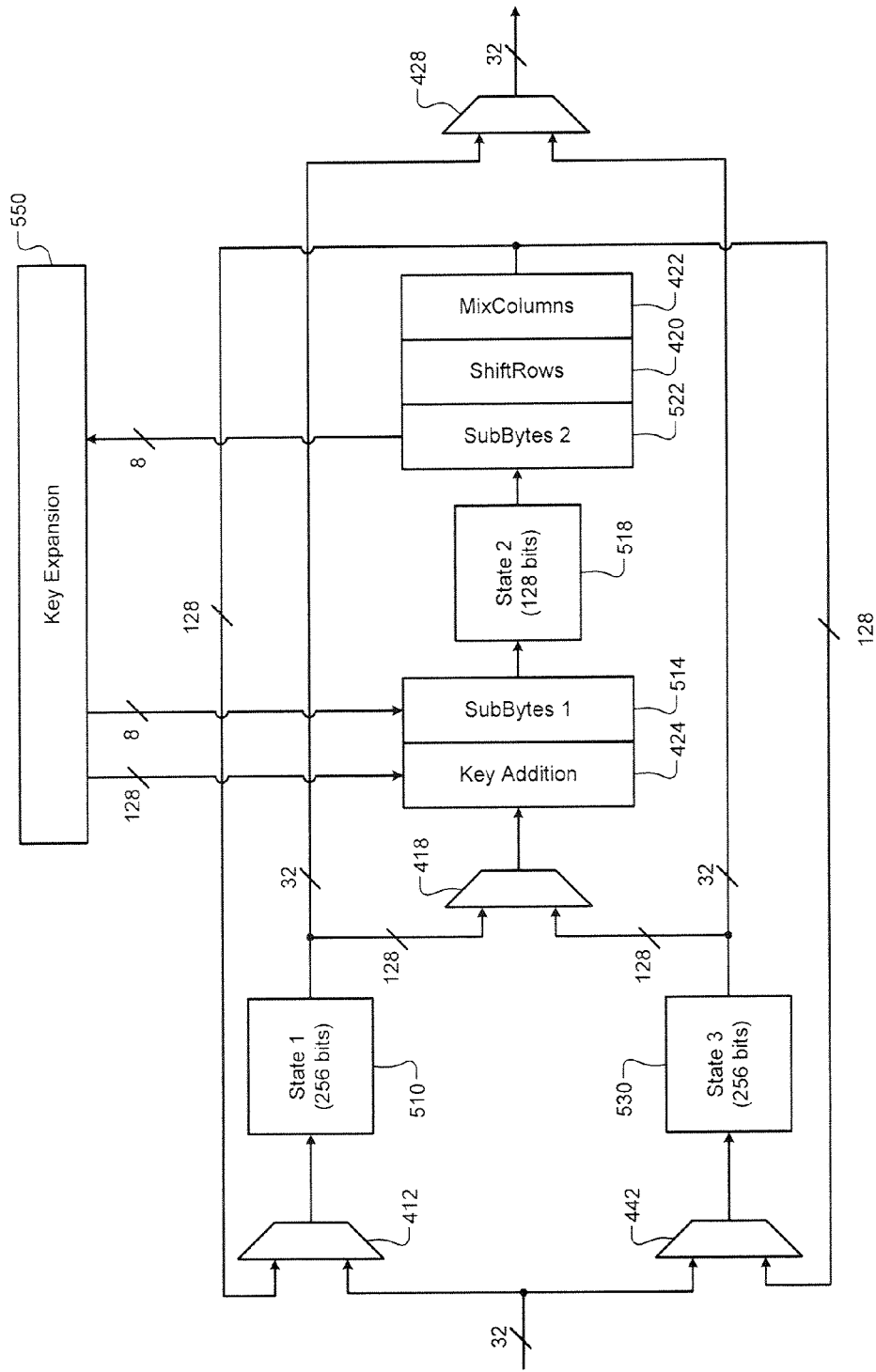

FIG. 7B depicts another key expansion module 550 used for offline key expansion. The key expansion module 550 transmits an 8-bit element to the first byte substitution module 514 and receives an 8-bit replacement element from the second byte substitution module 522. FIG. 7C depicts a functional block diagram similar to that of FIG. 7B, where the key addition module 424 is placed in front of the first byte substitution module 514.

Referring now to FIG. 8A, an exemplary implementation of a top level architecture using a pipelined S-box is presented. A first state module 610 can store 256 bits—i.e., two copies of the AES state. The first state module 610 receives inputs, such as 32-bit inputs, via the first multiplexer 412. The first multiplexer 412 may also select the output of the first state module 610 to be stored back into the first state module 610.

The first state module 610 outputs a first 128-bit AES state to the first byte substitution module 514 via the second multiplexer 418. The second state module 518 stores the output of the first byte substitution module 514. As the second state module 518 outputs the stored 128-bit value to the second byte substitution module 522, the first state module 610 outputs the second AES state to the first byte substitution module 514.

The output of the key addition module 424 is stored in a third state module 620. Next, the third state module 620 outputs the 128-bit value to the first byte substitution module 514 via the second multiplexer 418 as it receives the next 128-bit value. The two AES states travel in a loop between the second state module 518 and the third state module 620 to perform ten rounds of AES encryption or decryption. As the final round is being performed on the first AES state, the output of the key addition module 424 is output to a fourth state module 630 via a third multiplexer 640.

Figure 8C:
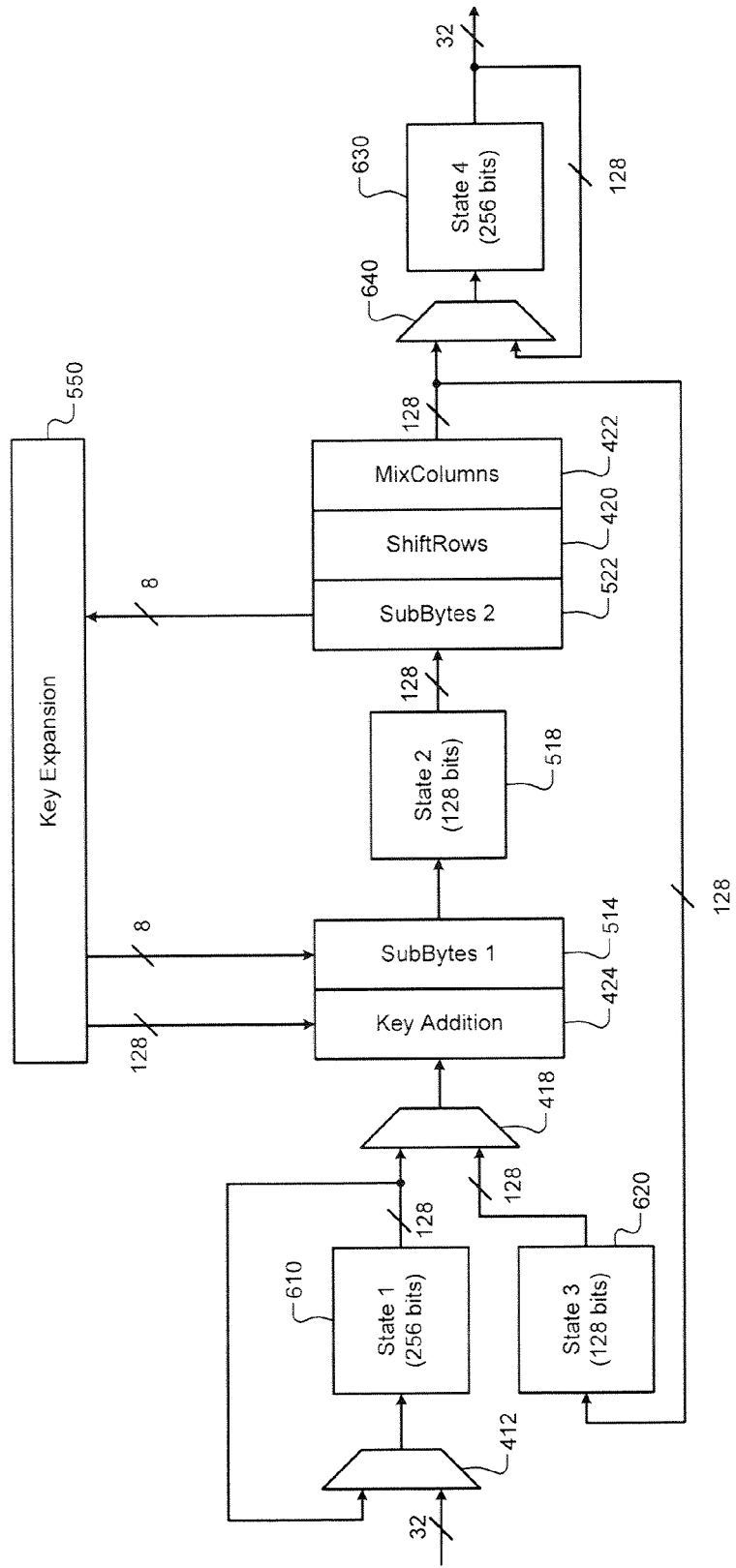

In the following clock cycle, the last round will be performed on the second AES state. The second AES state is then also stored in the fourth state module 630 via the third multiplexer 640. The fourth state module 630 then outputs each of the two AES states 32 bits at a time. So that two states can be stored, the fourth state module 630 has storage for 256 bits. FIG. 8B depicts another key expansion module 550 that can be used for offline key expansion. FIG. 8C depicts a functional block diagram similar to that of FIG. 8B, where the key addition module 424 is placed in front of the first byte substitution module 514.

Referring now to FIGS. 9A and 9B, AES encryption and decryption, respectively, are shown operating in electronic codebook (ECB) mode. In FIG. 9A, an AES encryption module 702 receives plaintext, which is encoded using a received key into ciphertext. The AES encryption module 702 may be implemented according to FIG. 1A as shown in FIGS. 7A-8C. In FIG. 9B, an AES decryption module 704 decrypts the ciphertext using the same key into plaintext. However, ECB mode may be susceptible to cryptographic attacks.

Referring now to FIGS. 10A and 10B, a counter mode for AES encryption and decryption, respectively, is presented. The AES encryption module 702 receives a value to be encrypted that is formed from an initialization value, or nonce, and a counter value. This nonce/counter value may be formed by concatenation, with the nonce as the most significant bits and the counter value as the least significant bits. The nonce may be combined with the counter value in any suitable manner, such as summation, logical XOR, and/or concatenation. The nonce may be unique for each group of blocks to be encrypted. For example only, a nonce value may be associated with each sector of a hard disk drive. The counter may be incremented for each block encrypted.

The nonce/counter value is encrypted using a received AES key, and the output of the AES encryption module 702 is XOR'd with the plaintext by an XOR module 706 to product ciphertext. In FIG. 10B, the AES encryption module 702 encrypts the nonce/counter value using the same AES key, the output of which is XOR'd with the ciphertext by the XOR module 706 to recover the plaintext. FIGS. 13A, 13B, 14A, 14B, 15A, and 15B depict the counter mode of operation for the top level architectures of FIGS. 6A, 6B, 7B, 7C, 8B, and 8C, respectively.

Referring now to FIGS. 11A and 11B, AES encryption and decryption, respectively, in LRW mode are presented. LRW mode uses a secret secondary key, which may be equal in size to the AES block size of 128 bits. LRW also uses a tweak value i. In various implementations, the tweak value i may be based on the location of the AES block within the set of blocks being encrypted.

A first XOR module 710 XORs the secondary key and the tweak value i. An output of the first XOR module 710 is received by second and third XOR modules 712 and 714. The second XOR module 712 XORs the output of the first XOR module 710 with the plaintext and outputs the result to the AES encryption module 702. Using the AES key, the AES encryption module 702 outputs an encrypted value to the third XOR module 714.

The third XOR module 714 XORs the outputs of the first XOR module 710 and the AES encryption module 702 to produce ciphertext. FIG. 11B is similar to FIG. 11A, with the AES encryption module 702 replaced by the AES decryption module 704. The second XOR module 712 receives the ciphertext, while the third XOR module 714 outputs the recovered plaintext.

Referring now to FIGS. 12A and 12B, AES encryption and decryption, respectively, according to an XTS mode are presented. XTS mode is currently adopted by draft standard IEEE P1619, the disclosure of which is incorporated herein by reference in its entirety. The latest version is P1619-D16, "Standard for Cryptographic Protection of Data on Block-Oriented Storage Devices," published May 16, 2007.

XTS mode uses XEX-based tweaked codebook for encryption and decryption. XEX is shorthand for an XOR operation, followed by an encryption operation, followed by another XOR operation. As with LRW, a tweak is applied. XTS mode uses ciphertext stealing, which copies the ciphertext of another block to pad a group of bits to be encrypted that is not the size of a full block.

A second AES encryption module 720 encodes the 128-bit tweak value i using a secret secondary key. The AES encryption module 702 may also operate as the second AES encryption module 720 if layout area is more important than speed. A multiplication module 722 multiplies, in $GF(2^{128})$, the output of the second AES encryption module 720 and $\alpha^j$. The value $\alpha$ is a predetermined primitive polynomial in $GF(2^{128})$, and $\alpha^j$ is the primitive $\alpha$ raised to the power of j.

The value j is another tweak value, which may be based on the block number within a data unit for the block currently being encrypted. The output of the multiplication module 722 is output to the second and third XOR modules 712 and 714. The second XOR module 712 XORs the output of the multiplication module 722 with plaintext. The result is encrypted by the AES encryption module 702 using the AES key. The output of the AES encryption module 702 is XOR'd with the output of the multiplication module 722 by the third XOR module 714. The output of the third XOR module 714 is ciphertext.

FIG. 12B is similar to FIG. 12A, except that the AES decryption module 704 is used in place of the AES encryption module 702. The second XOR module 712 receives the ciphertext. The third XOR module 714 outputs the recovered plaintext.

Figure 13A:
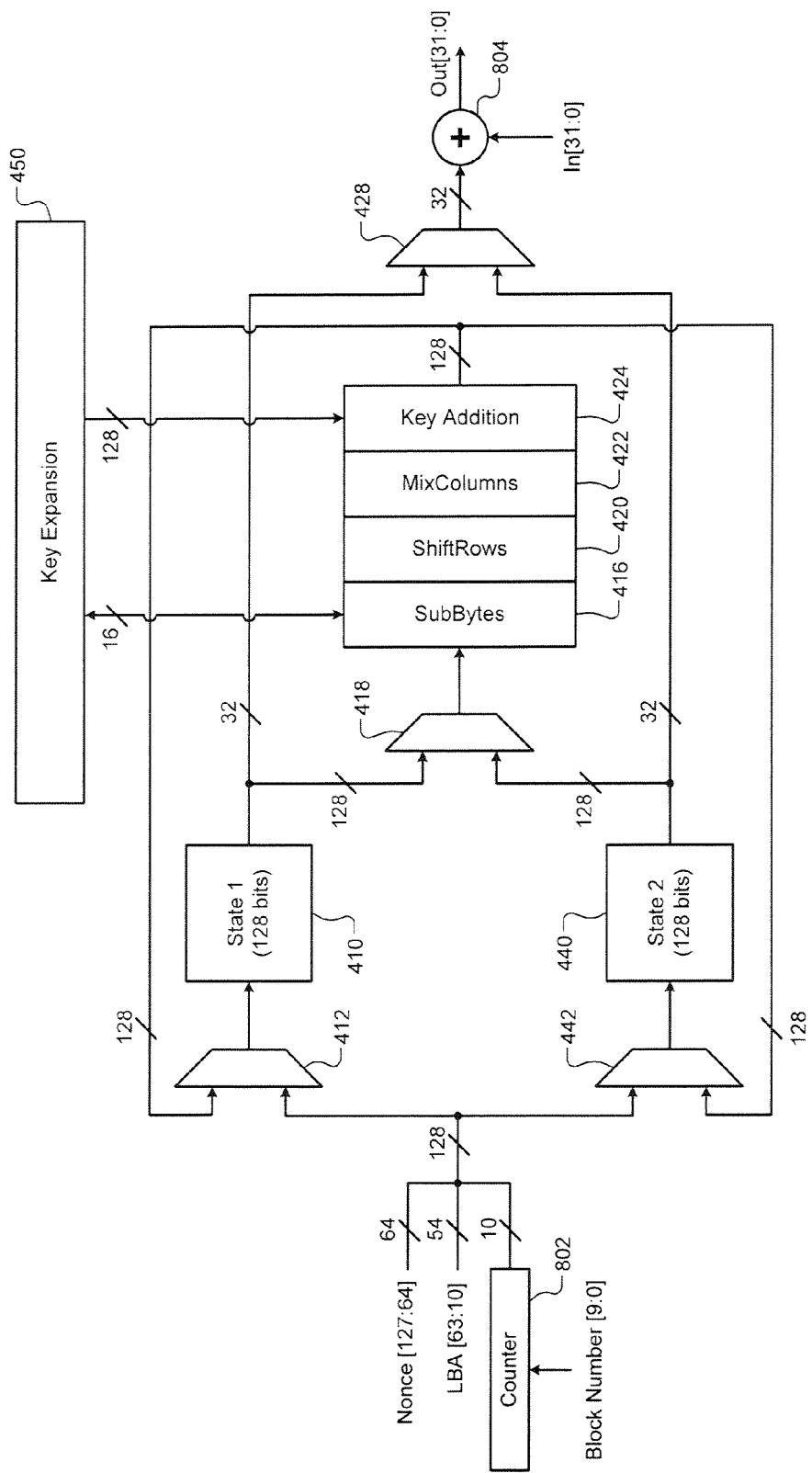
FIGS. 13A, 13B, 14A, 14B, 15A, and 15B are functional block diagrams of exemplary implementations of the top level architectures of FIGS. 6A, 6B, 7B, 7C, 8B, and 8C, respectively, operating in counter mode according to the principles of the present disclosure.

Referring now to FIG. 13A, a functional block diagram depicts an exemplary implementation of the top level architecture of FIG. 6A in counter mode. A counter module 802 receives an initialization value, such as a block number. In various implementations, the block number may be 10 bits long. The output of the counter module 802 may be concatenated with a logical block address (LBA) and an initialization value, or nonce, to form a 128-bit value.

The 128-bit value is then received by either the first state module 410 or the second state module 440. The counter module 802 increments its output for each 128-bit output value produced. Because ten rounds of encryption are used, corresponding to ten clock cycles, the counter module 802 may increment once every ten clock cycles. The 128-bit value is then encrypted, similarly to FIG. 6A, and the resulting encrypted value is output 32 bits at a time via the third multiplexer 428.

The output of the third multiplexer 428 is received by an XOR module 804. The XOR module 804 XORs the 32-bit output of the third multiplexer 428 with a received 32-bit plaintext value to produce a 32-bit ciphertext value. The same structure can be used to XOR the output of the third multiplexer 428 with a 32-bit input ciphertext value to recover the 32-bit plaintext value.

Figure 13B:
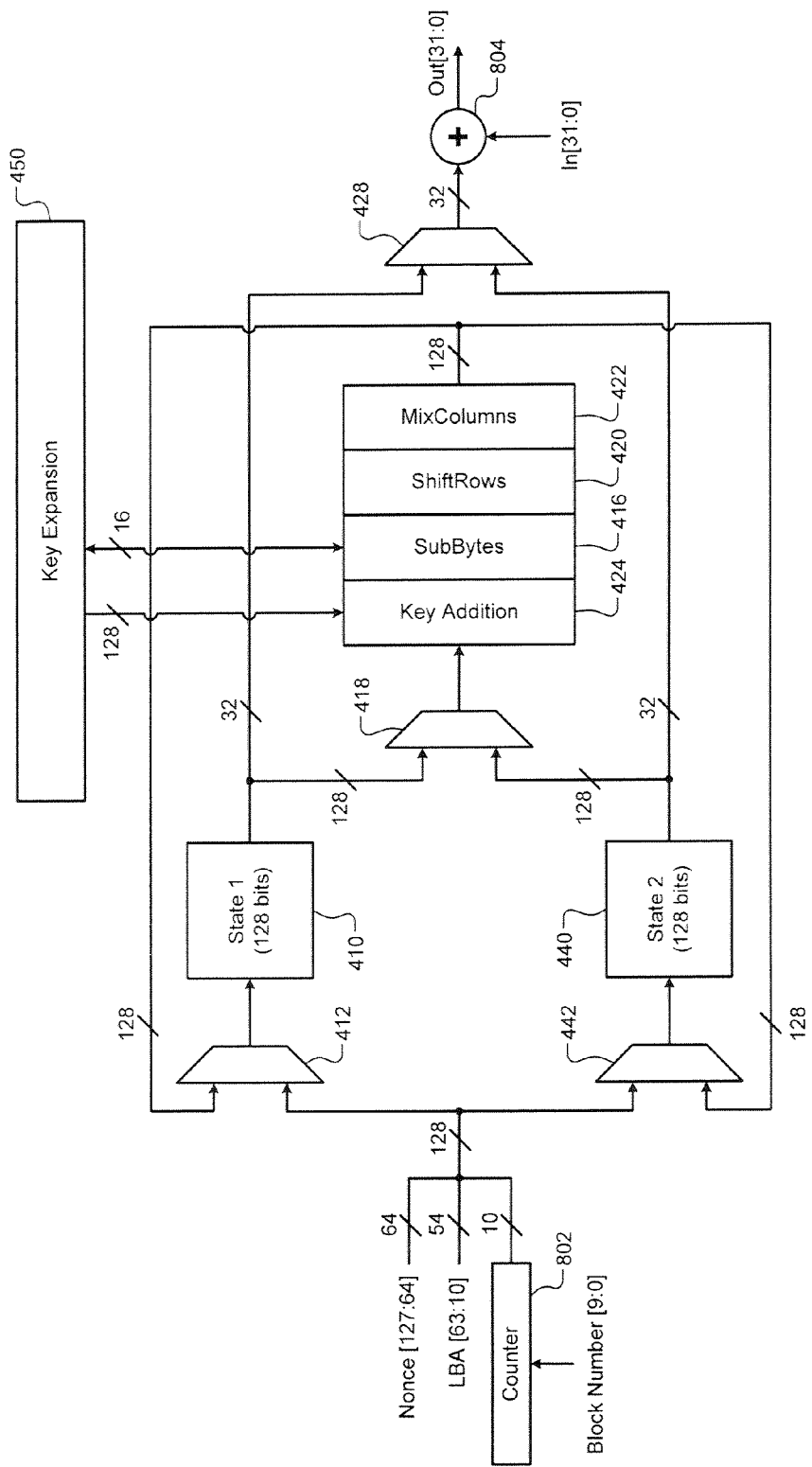
Figure 14A:
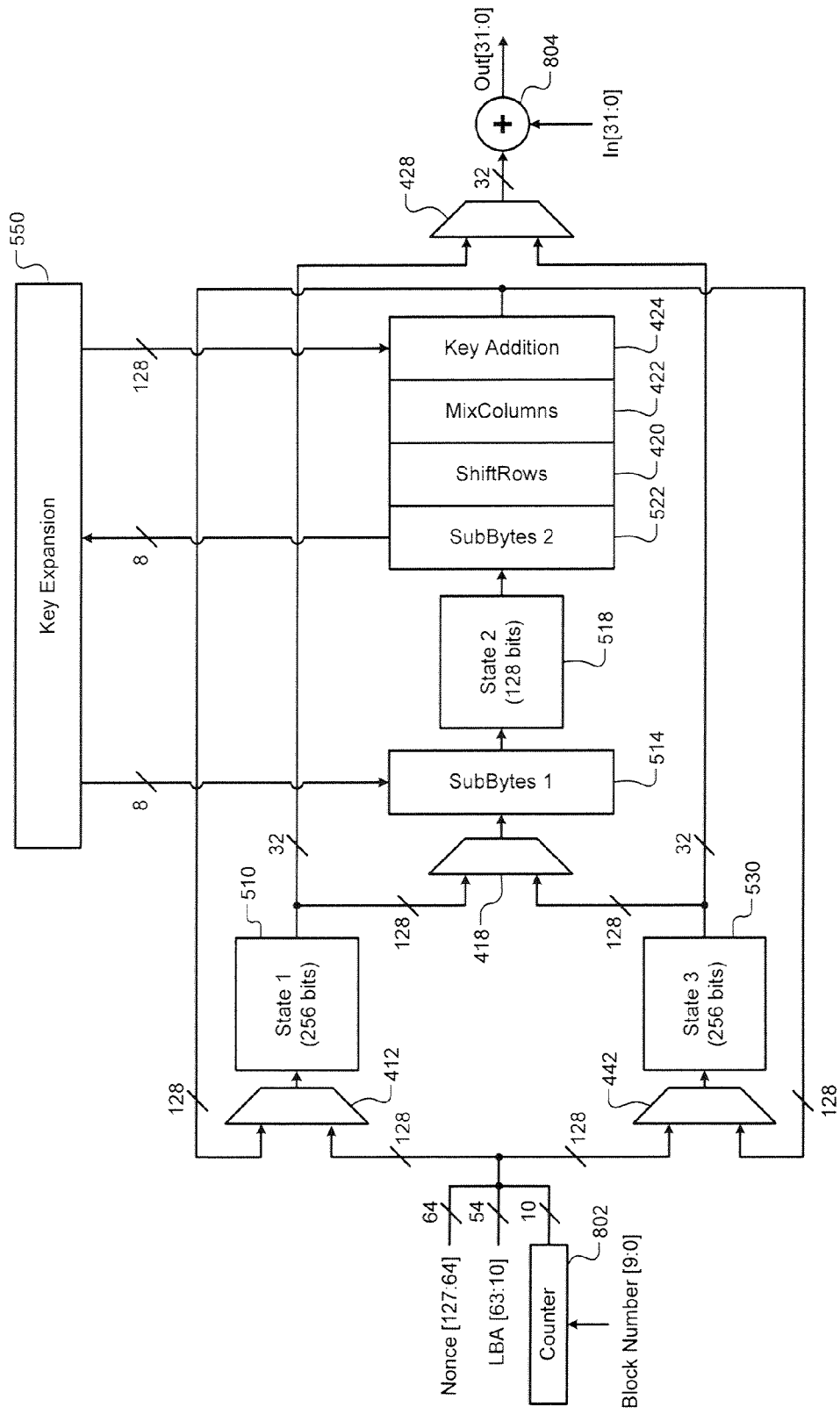
Figure 14B:
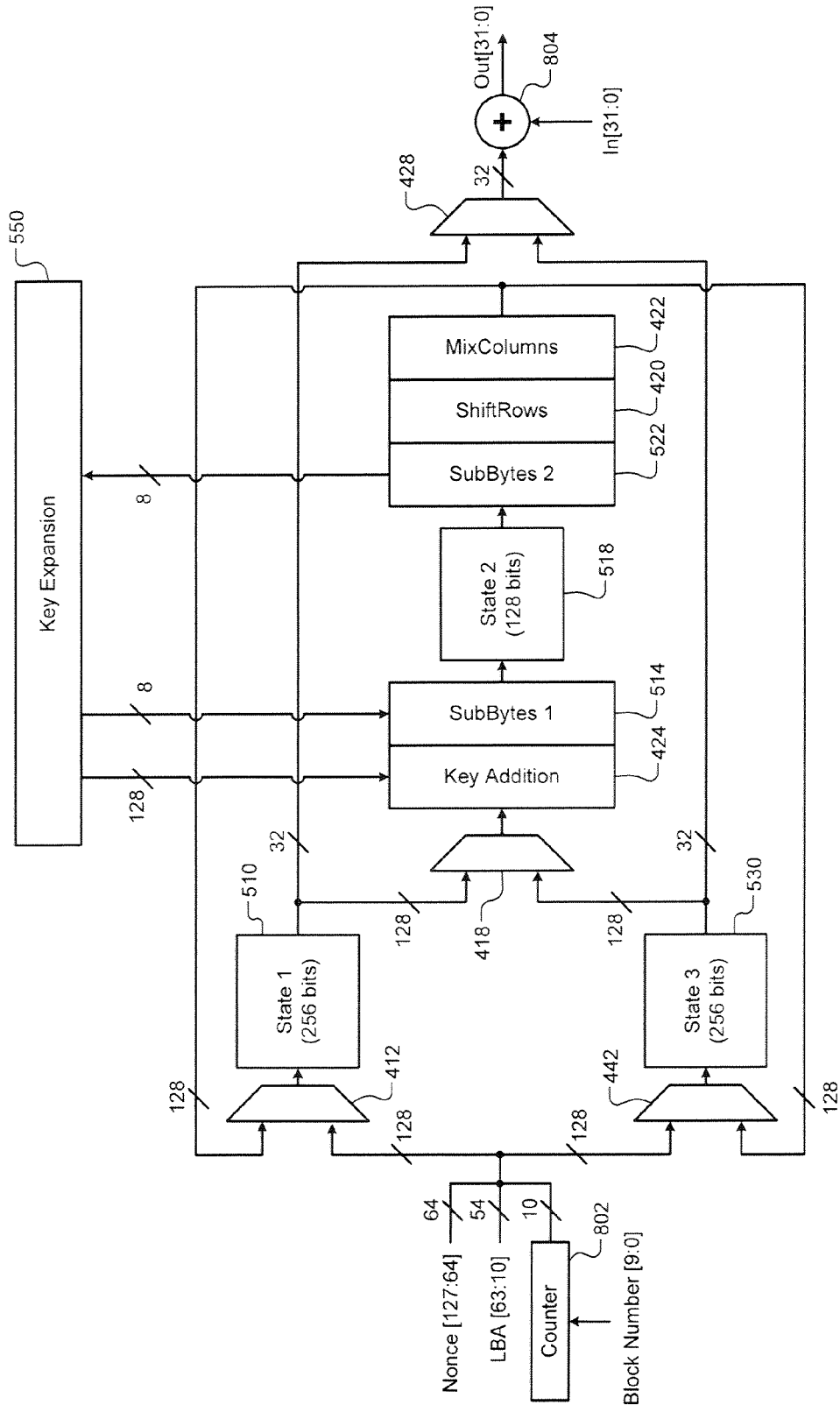

FIG. 13B depicts a functional block diagram similar to that of FIG. 13A, where the key addition module 424 is placed in front of the first byte substitution module 416. FIG. 14A is similar to FIG. 13A and includes the encryption engine of FIG. 7B. FIG. 14B depicts a functional block diagram similar to that of FIG. 14A, where the key addition module 424 is placed in front of the first byte substitution module 514.

Figure 15A:
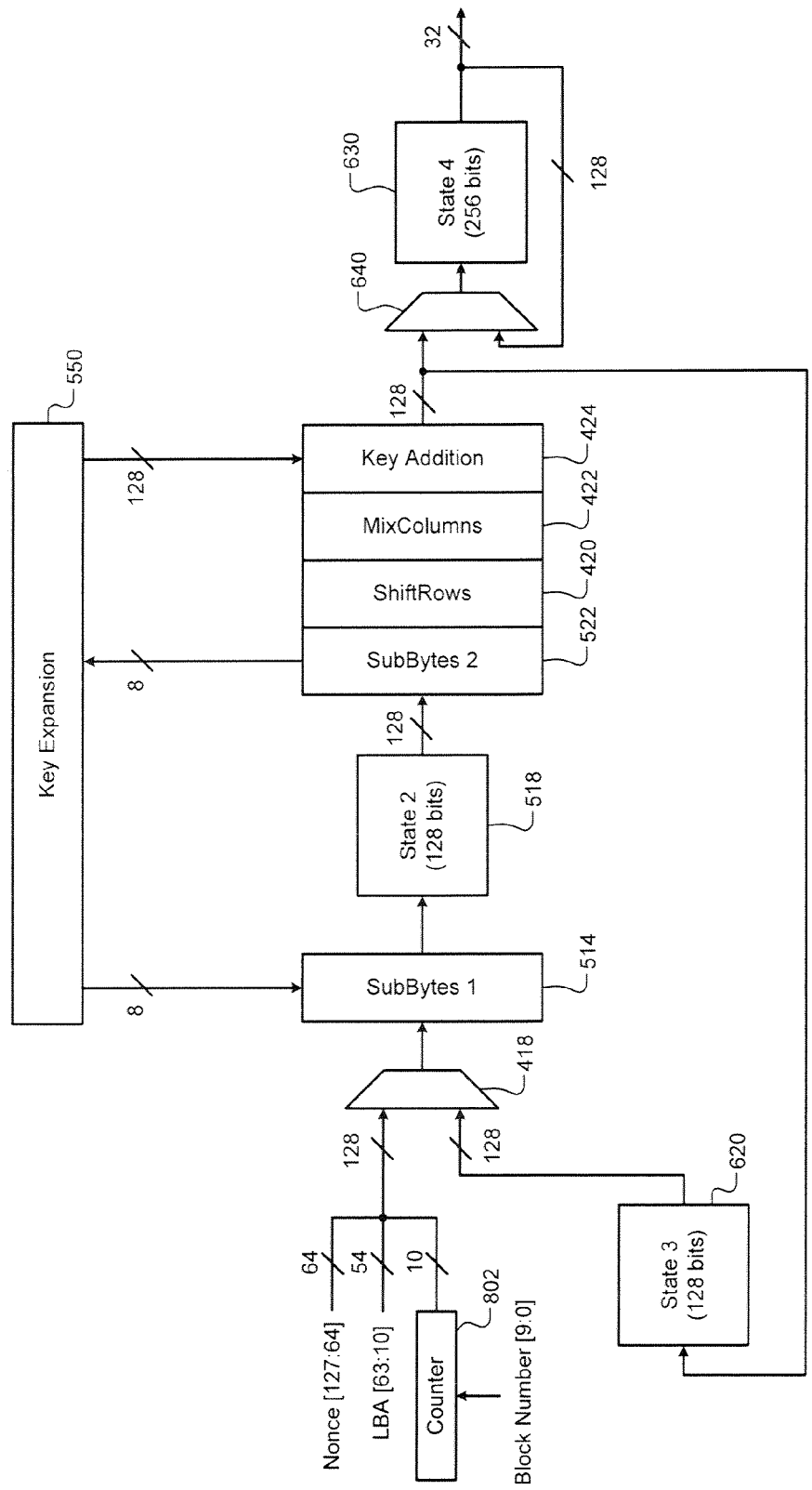
Figure 15B:
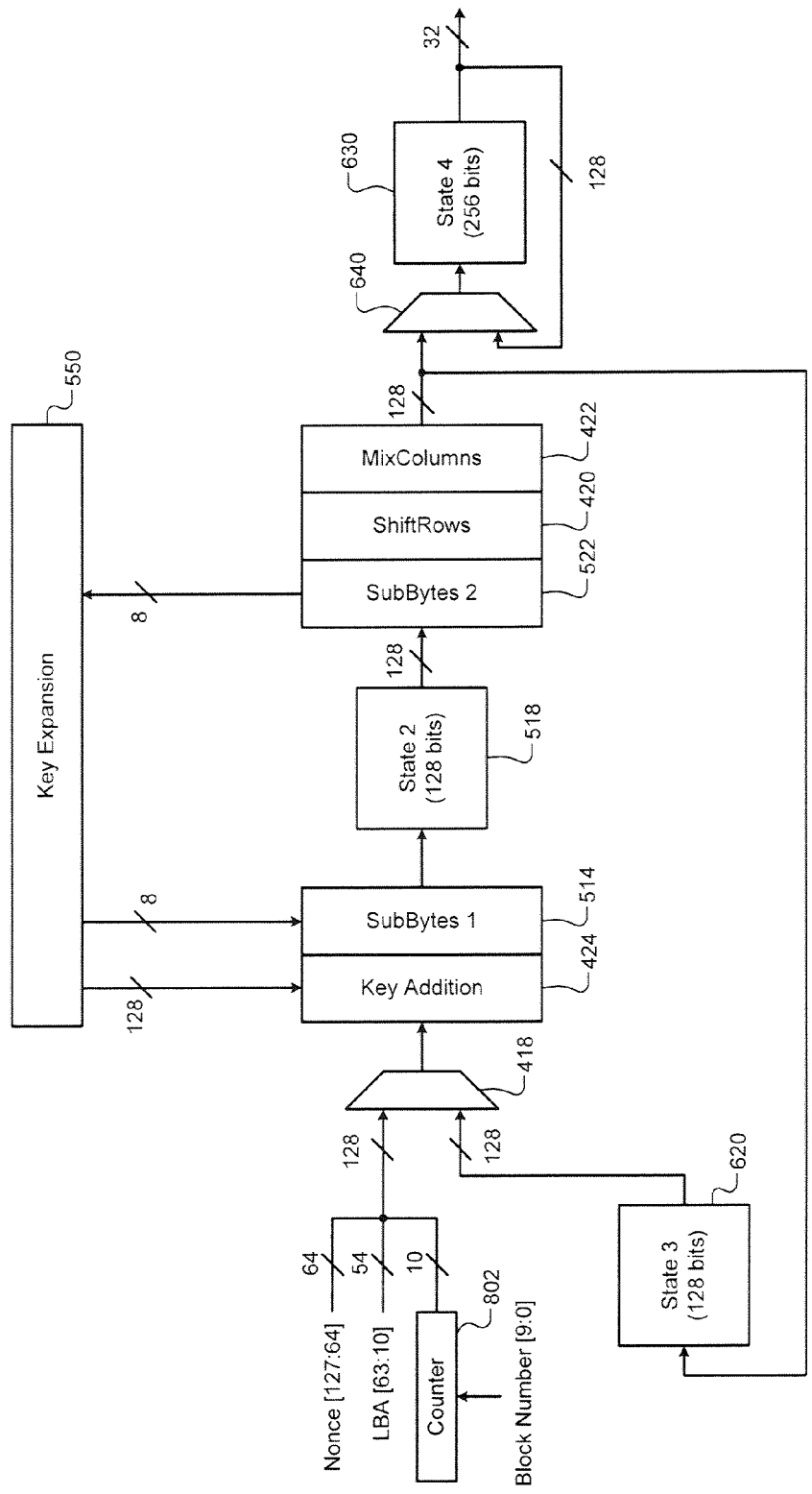

Referring now to FIG. 15A, a counter mode implementation of the AES engine of FIG. 8B is depicted. Because the 128-bit value resulting from the counter module 802, the LBA, and the nonce, is received at one time, the 128-bit value may be input directly to the second multiplexer 418. FIG. 15B depicts a functional block diagram similar to that of FIG. 15A, where the key addition module 424 is placed in front of the first byte substitution module 514.

Figure 16A:
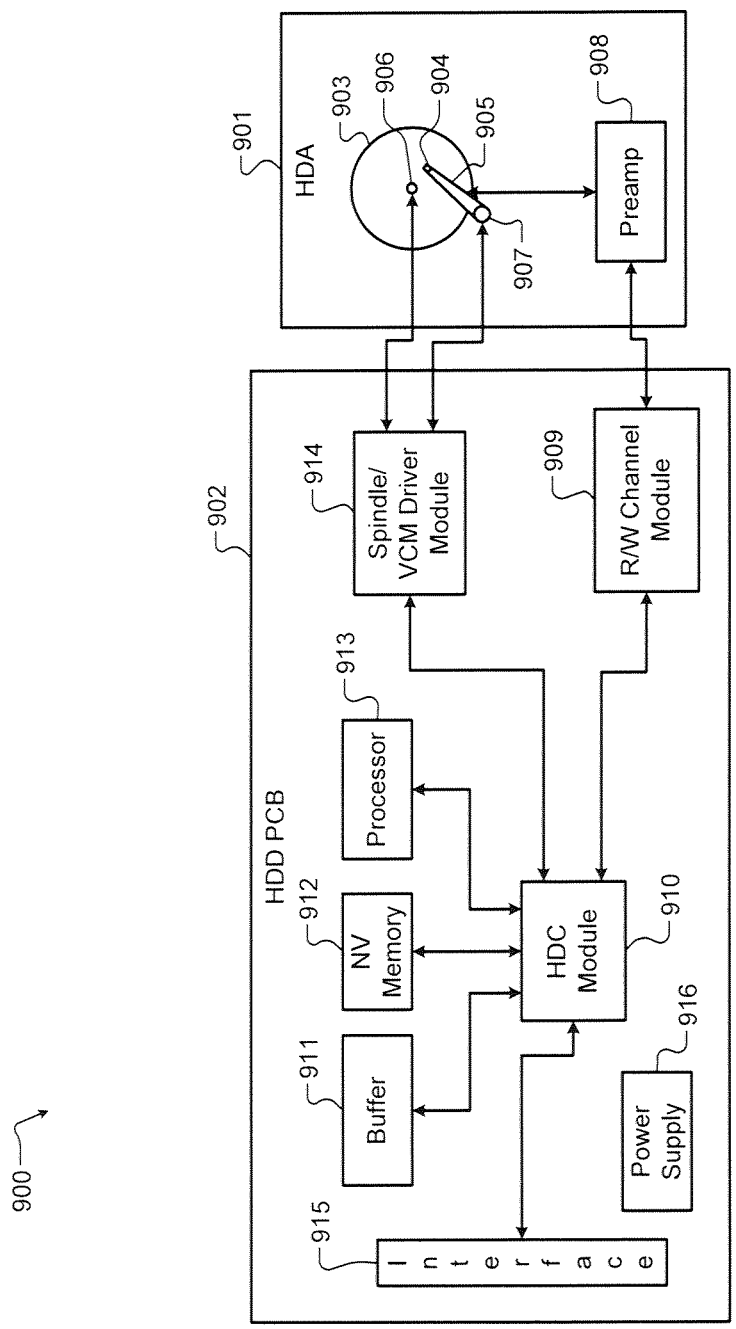
FIG. 16A is a functional block diagram of a hard disk drive according to the principles of the present disclosure.

Referring now to FIGS. 16A-16G, various exemplary implementations incorporating the teachings of the present disclosure are shown. Referring now to FIG. 16A, the teachings of the disclosure can be implemented in a read/write channel module (hereinafter, "read channel") 909 of a hard disk drive (HDD) 900. The HDD 900 includes a hard disk assembly (HDA) 901 and an HDD printed circuit board (PCB) 902. The HDA 901 may include a magnetic medium 903, such as one or more platters that store data, and a read/write device 904.

The read/write device 904 may be arranged on an actuator arm 905 and may read and write data on the magnetic medium 903. Additionally, the HDA 901 includes a spindle motor 906 that rotates the magnetic medium 903 and a voice-coil motor (VCM) 907 that actuates the actuator arm 905. A preamplifier device 908 amplifies signals generated by the read/write device 904 during read operations and provides signals to the read/write device 904 during write operations.

The HDD PCB 902 includes the read channel 909, a hard disk controller (HDC) module 910, a buffer 911, nonvolatile memory 912, a processor 913, and a spindle/VCM driver module 914. The read channel 909 processes data received from and transmitted to the preamplifier device 908. The HDC module 910 controls components of the HDA 901 and communicates with an external device (not shown) via an I/O interface 915. The external device may include a computer, a multimedia device, a mobile computing device, etc. The I/O interface 915 may include wireline and/or wireless communication links.

The HDC module 910 may receive data from the HDA 901, the read channel 909, the buffer 911, nonvolatile memory 912, the processor 913, the spindle/VCM driver module 914, and/or the I/O interface 915. The processor 913 may process the data, including encoding, decoding, filtering, and/or formatting. The processed data may be output to the HDA 901, the read channel 909, the buffer 911, nonvolatile memory 912, the processor 913, the spindle/VCM driver module 914, and/or the I/O interface 915.

The HDC module 910 may use the buffer 911 and/or nonvolatile memory 912 to store data related to the control and operation of the HDD 900. The buffer 911 may include DRAM, SDRAM, etc. Nonvolatile memory 912 may include any suitable type of semiconductor or solid-state memory, such as flash memory (including NAND and NOR flash memory), phase change memory, magnetic RAM, and multi-state memory, in which each memory cell has more than two states. The spindle/VCM driver module 914 controls the spindle motor 906 and the VCM 907. The HDD PCB 902 includes a power supply 916 that provides power to the components of the HDD 900.

Figure 16B:
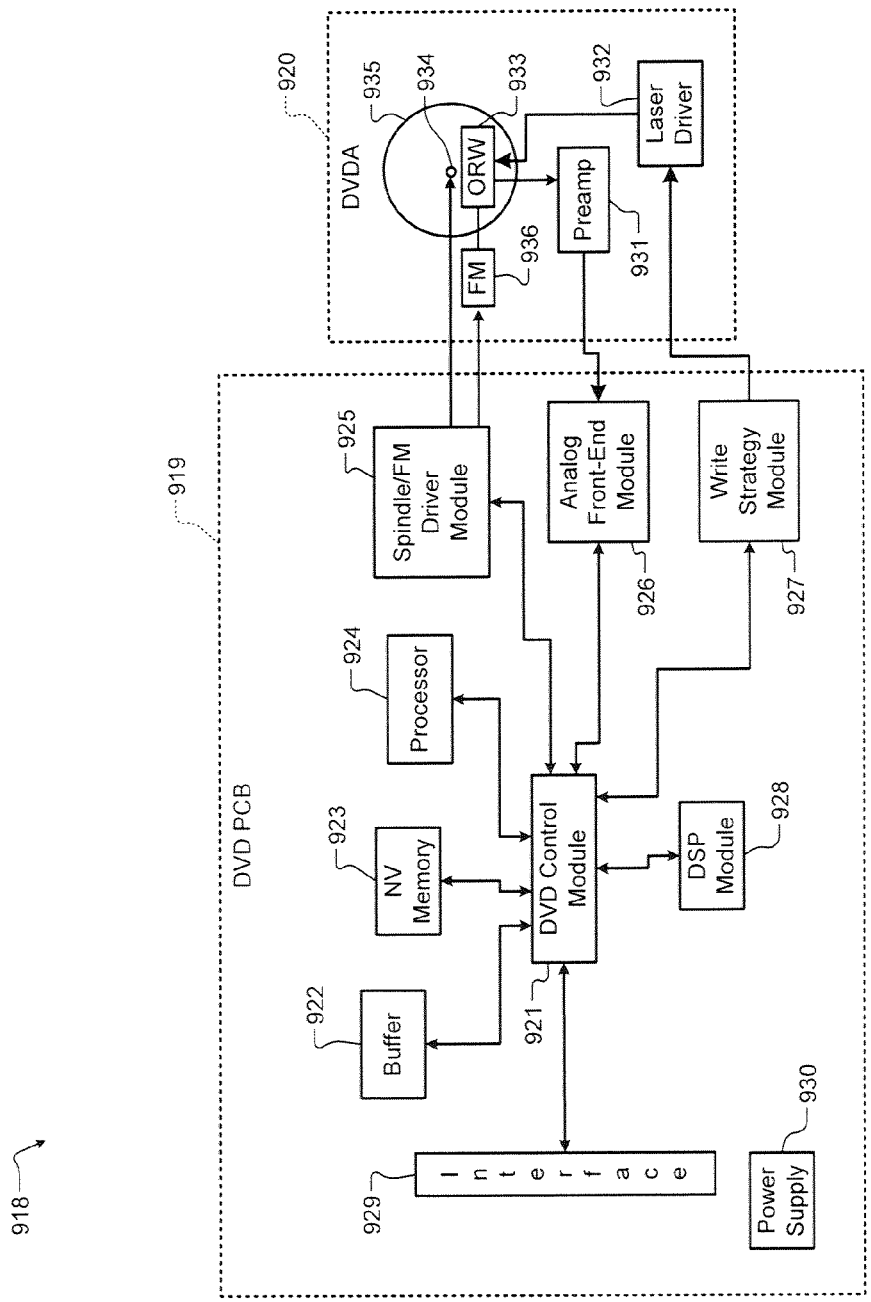
FIG. 16B is a functional block diagram of a DVD drive according to the principles of the present disclosure.

Referring now to FIG. 16B, the teachings of the disclosure can be implemented in a DVD control module 921 of a DVD drive 918 or of a CD drive (not shown). The DVD drive 918 includes a DVD PCB 919 and a DVD assembly (DVDA) 920. The DVD PCB 919 includes the DVD control module 921, a buffer 922, nonvolatile memory 923, a processor 924, a spindle/FM (feed motor) driver module 925, an analog front-end module 926, a write strategy module 927, and a DSP module 928.

The DVD control module 921 controls components of the DVDA 920 and communicates with an external device (not shown) via an I/O interface 929. The external device may include a computer, a multimedia device, a mobile computing device, etc. The I/O interface 929 may include wireline and/or wireless communication links.

The DVD control module 921 may receive data from the buffer 922, nonvolatile memory 923, the processor 924, the spindle/FM driver module 925, the analog front-end module 926, the write strategy module 927, the DSP module 928, and/or the I/O interface 929. The processor 924 may process the data, including encoding, decoding, filtering, and/or formatting. The DSP module 928 performs signal processing, such as video and/or audio coding/decoding. The processed data may be output to the buffer 922, nonvolatile memory 923, the processor 924, the spindle/FM driver module 925, the analog front-end module 926, the write strategy module 927, the DSP module 928, and/or the I/O interface 929.

The DVD control module 921 may use the buffer 922 and/or nonvolatile memory 923 to store data related to the control and operation of the DVD drive 918. The buffer 922 may include DRAM, SDRAM, etc. Nonvolatile memory 923 may include any suitable type of semiconductor or solid-state memory, such as flash memory (including NAND and NOR flash memory), phase change memory, magnetic RAM, and multi-state memory, in which each memory cell has more than two states. The DVD PCB 919 includes a power supply 930 that provides power to the components of the DVD drive 918.

The DVDA 920 may include a preamplifier device 931, a laser driver 932, and an optical device 933, which may be an optical read/write (ORW) device or an optical read-only (OR) device. A spindle motor 934 rotates an optical storage medium 935, and a feed motor 936 actuates the optical device 933 relative to the optical storage medium 935.

When reading data from the optical storage medium 935, the laser driver provides a read power to the optical device 933. The optical device 933 detects data from the optical storage medium 935, and transmits the data to the preamplifier device 931. The analog front-end module 926 receives data from the preamplifier device 931 and performs such functions as filtering and A/D conversion. To write to the optical storage medium 935, the write strategy module 927 transmits power level and timing data to the laser driver 932. The laser driver 932 controls the optical device 933 to write data to the optical storage medium 935.

Figure 16D:
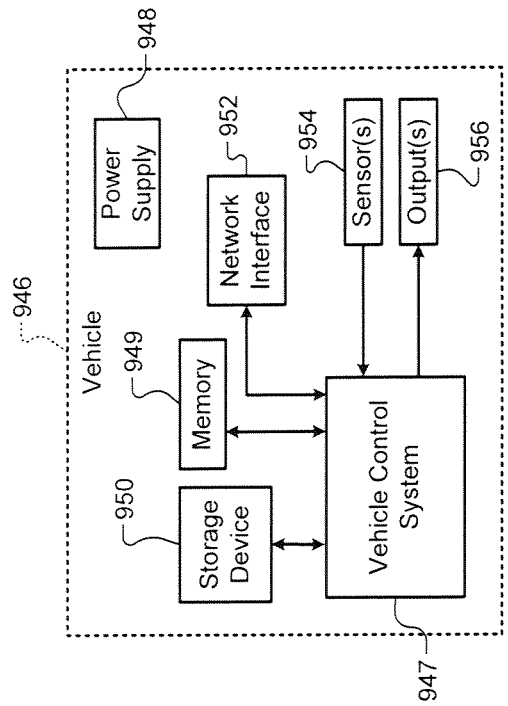
FIG. 16D is a functional block diagram of a vehicle control system according to the principles of the present disclosure.
Figure 16C:
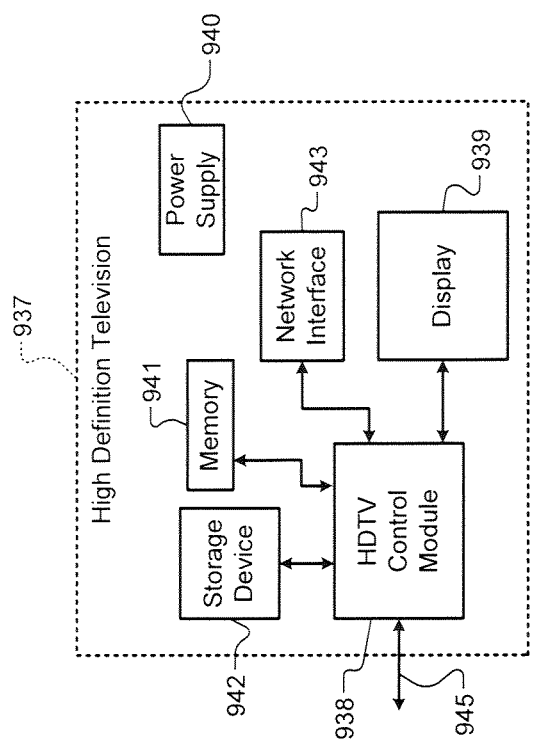
FIG. 16C is a functional block diagram of a high definition television according to the principles of the present disclosure.

Referring now to FIG. 16C, the teachings of the disclosure can be implemented in a storage device 942 of a high definition television (HDTV) 937. The HDTV 937 includes an HDTV control module 938, a display 939, a power supply 940, memory 941, the storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Referring now to FIG. 16D, the teachings of the disclosure may be implemented in a storage device 950 of a vehicle 946. The vehicle 946 may include a vehicle control system 947, a power supply 948, memory 949, the storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the network interface 952.

Figure 16F:
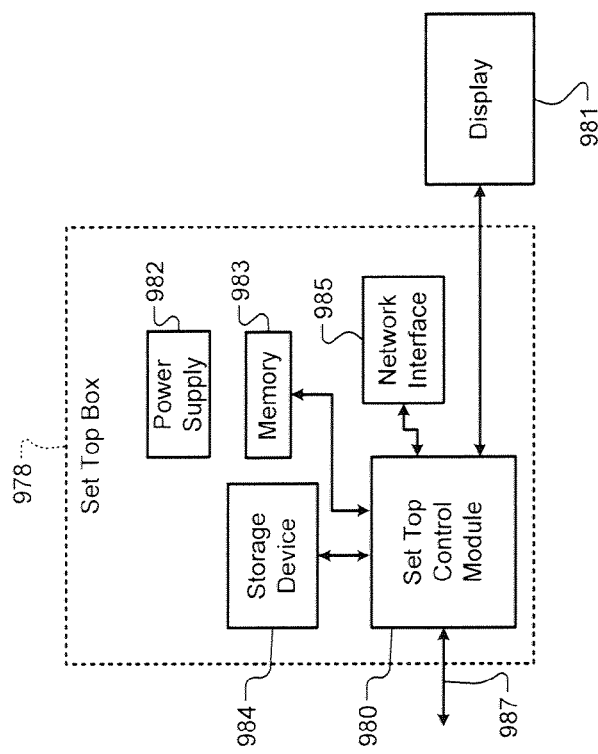
FIG. 16F is a functional block diagram of a set top box according to the principles of the present disclosure.
Figure 16E:
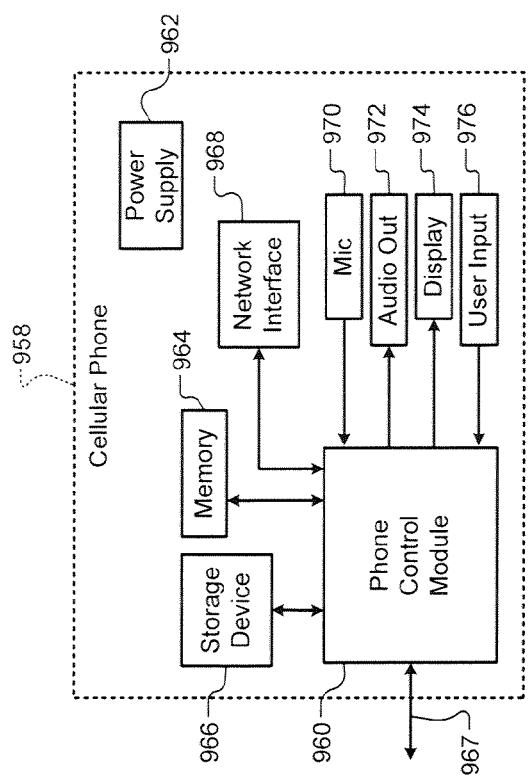
FIG. 16E is a functional block diagram of a cellular phone according to the principles of the present disclosure.

Referring now to FIG. 16E, the teachings of the disclosure can be implemented in a storage device 966 of a cellular phone 958. The cellular phone 958 includes a phone control module 960, a power supply 962, memory 964, the storage device 966, and a cellular network interface 967. The cellular phone 958 may include a network interface 968, a microphone 970, an audio output 972 such as a speaker and/or output jack, a display 974, and a user input device 976 such as a keypad and/or pointing device. If the network interface 968 includes a wireless local area network interface, an antenna (not shown) may be included.

The phone control module 960 may receive input signals from the cellular network interface 967, the network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 16F, the teachings of the disclosure can be implemented in a storage device 984 of a set top box 978. The set top box 978 includes a set top control module 980, a display 981, a power supply 982, memory 983, the storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 16G:
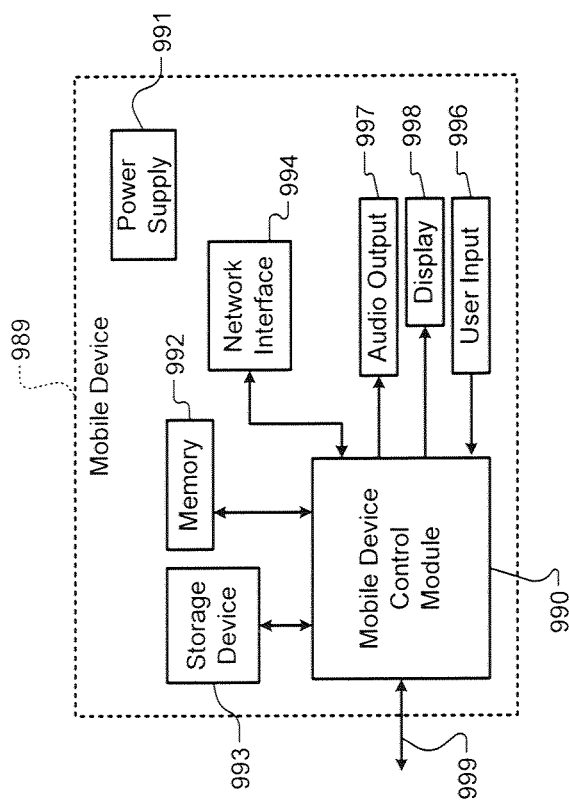
FIG. 16G is a functional block diagram of a mobile device according to the principles of the present disclosure.

Referring now to FIG. 16G, the teachings of the disclosure can be implemented in a storage device 993 of a mobile device 989. The mobile device 989 may include a mobile device control module 990, a power supply 991, memory 992, the storage device 993, a network interface 994, and an external interface 999. If the network interface 994 includes a wireless local area network interface, an antenna (not shown) may be included.

The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cryptographic device comprising:
a first state module configured to store a first data block;
a key addition module configured to (i) receive the first data block from the first state module, and (ii) add a key to the first data block to generate a second data block;
a byte substitution module configured to (i) receive the second data block from the key addition module, and (ii) replace each byte of the second data block to generate a third data block, wherein the byte substitution module comprises
a first byte substitution sub-module configured to generate an intermediate data block in response to the second data block from the key addition module,
a pipeline register configured to store the intermediate data block, and
a second byte substitution sub-module configured to generate the third data block in response to the intermediate data block from the pipeline register; and
a column mixing module configured to (i) generate a fourth data block based on the third data block and (ii) provide the fourth data block to the first state module for storage.

2. The cryptographic device of claim 1, further comprising a row shifting module located between the byte substitution module and the column mixing module and configured to provide the column mixing module with a reordered form of the third data block.

3. A cryptographic device comprising:
a first state module configured to store a first data block,
a key addition module configured to (i) receive the first data block from the first state module, and (ii) add a key to the first data block to generate a second data block;
a byte substitution module configured to (i) receive the second data block from the key addition module, and (ii) replace each byte of the second data block to generate a third data block;
a column mixing module configured to (i) generate a fourth data block based on the third data block and (ii) provide the fourth data block to the first state module for storage; and
a second state module configured to store a fifth data block, wherein the key addition module is configured to (i) during a first period of time, receive the first data block from the first state module and (ii) during a second period of time, receive the fifth data block from the second state module.

4. The cryptographic device of claim 3, further comprising a multiplexer that selectively connects the key addition module to one of the first state module and the second state module.

5. The cryptographic device of claim 3, wherein during the first period of time, the first state module outputs, in separate clock cycles, each of a plurality of data sub-blocks of a processed data block, wherein the processed data block is one of a decrypted data block or an encrypted data block.

6. The cryptographic device of claim 3, wherein:
during the first period of time, the first state module is configured to receive the fourth data block from the column mixing module; and
during the second period of time, the second state module is configured to receive a sixth data block from the column mixing module.

7. The cryptographic device of claim 6, further comprising a first multiplexer that selectively connects the first state module to one of the column mixing module and an input bus.

8. The cryptographic device of claim 7, further comprising a second multiplexer that selectively connects the second state module to one of the column mixing module and the input bus.

9. The cryptographic device of claim 7, wherein the first data block includes a plurality of data sub-blocks, and wherein the first state module receives, in separate clock cycles, each of the plurality of data sub-blocks from the input bus.

10. A method of operating a cryptographic device, the method comprising:
storing a first data block in a first state module;
adding a key to the first data block to generate a second data block;
replacing each byte of the second data block to generate a third data block;
generating a fourth data block by mixing columns of data based on the third data block;
providing the fourth data block to the first state module for storage;
storing, in the first state module, the fourth data block in place of the first data block;
generating an intermediate data block by performing predetermined mathematical operations on the second data block;
storing the intermediate data block in a pipeline register; and
generating the third data block by performing predetermined mathematical operations on the intermediate data block from the pipeline register.

11. The method of claim 10, further comprising generating a reordered form of the third data block, wherein the generating the fourth data block is performed in response to the reordered form of the third data block.

12. A method of operating a cryptographic device, the method comprising:
storing a first data block in a first state module;
adding a key to the first data block to generate a second data block;
replacing each byte of the second data block to generate a third data block;
generating a fourth data block by mixing columns of data based on the third data block;
providing the fourth data block to the first state module for storage;
storing, in the first state module, the fourth data block in place of the first data block;
storing a fifth data block in a second state module;
during a first period of time, adding the key to the first data block from the first state module; and
during a second period of time, adding the key to the fifth data block from the second state module.

13. The method of claim 12, further comprising:
during the first period of time, connecting the first state module to a module that performs the adding the key; and
during the second period of time, connecting the second state module to the module that performs the adding the key.

14. The method of claim 12, further comprising, during the first period of time, outputting, in separate clock cycles, each of a plurality of data sub-blocks of a processed data block, wherein the processed data block is one of a decrypted data block or an encrypted data block.

15. The method of claim 12, further comprising:
during the first period of time, storing the fourth data block in the first state module; and
during the second period of time, storing a sixth data block in the second state module, wherein the sixth data block is generated by mixing columns of data.

16. The method of claim 15, further comprising selectively connecting the first state module to an input bus.

17. The method of claim 16, further comprising selectively connecting the second state module to the input bus.

18. The method of claim 16, wherein the first data block includes a plurality of data sub-blocks, the method further comprising receiving, at the first state module each of the plurality of data sub-blocks from the input bus in separate clock cycles.

* * * * *